Figure 1:
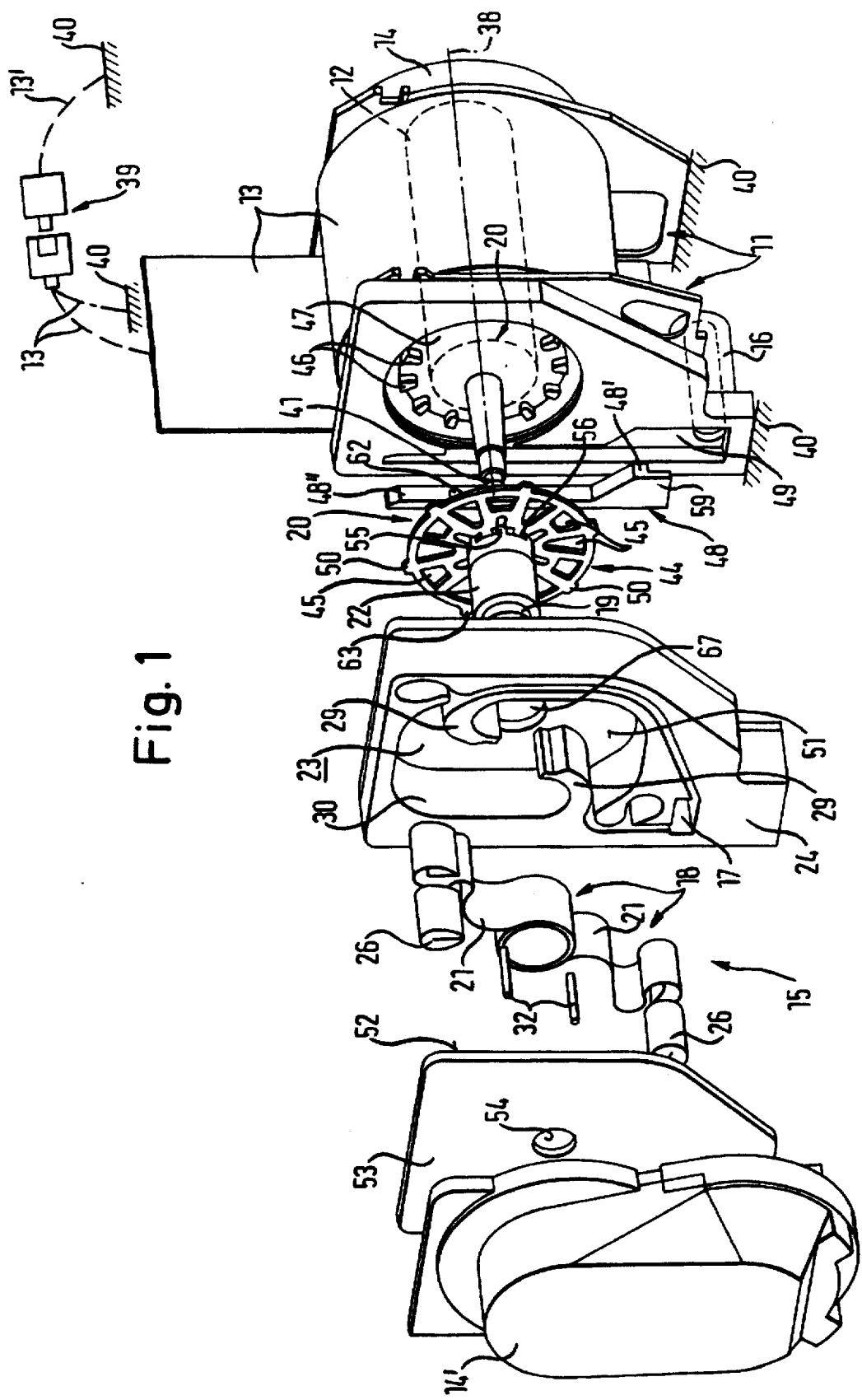

United States Patent [19]

Mitzkus et al.

[11] Patent Number: 5,667,161
[45] Date of Patent: Sep. 16, 1997

[54] BELT TENSIONER FOR SAFETY BELTS FOR MOTOR VEHICLES

[75] Inventors: Jürgen Mitzkus, Eichingen; Robert Kopetzky, Lonsee, both of Germany

[73] Assignee: Takata (Europe) Vehicle Safety Technology GmbH, Germany

[21] Appl. No.: 596,569

[22] Filed: Feb. 5, 1996

Related U.S. Application Data

[62] Division of Ser. No. 381,777, Feb. 1, 1995, Pat. No. 5,553,803.

[30] Foreign Application Priority Data

Sep. 13, 1994 [DE] Germany ............... 44 32 594.9

[51] Int. Cl.$^6$ ................................. B60R 52/46
[52] U.S. Cl. ........................... 242/374; 280/806
[58] Field of Search ............. 242/374; 280/806; 297/480; 92/90; 418/45

[56] References Cited

U.S. PATENT DOCUMENTS

| | | | |
|---|---|---|---|
| 1,138,738 | 5/1915 | Earll . | |
| 2,477,907 | 8/1949 | Smith | 241/138 |
| 3,481,253 | 12/1969 | Floyd | 92/64 |
| 4,151,967 | 5/1979 | Lindblad . | |
| 4,572,457 | 2/1986 | Hirata . | |
| 4,838,148 | 6/1989 | Denker | 92/90 |
| 5,050,814 | 9/1991 | Butenop et al. . | |
| 5,261,320 | 11/1993 | Niederstadt | 992/90 |
| 5,314,137 | 5/1994 | Fujimara et al. . | |

FOREIGN PATENT DOCUMENTS

| | | |
|---|---|---|
| 0059643 B1 | 5/1985 | European Pat. Off. . |
| 0581288 A1 | 2/1994 | European Pat. Off. . |
| 0600689 A1 | 6/1994 | European Pat. Off. . |
| 2517572 A1 | 11/1975 | Germany . |
| 2505626 A1 | 8/1976 | Germany . |
| 3215927 A1 | 11/1983 | Germany . |
| 3531856 A1 | 12/1986 | Germany . |
| 3528162 A1 | 2/1987 | Germany . |
| 2857840 C2 | 10/1987 | Germany . |
| 3690661 T1 | 12/1987 | Germany . |
| 3904158 A1 | 8/1990 | Germany . |
| 4111117 C1 | 5/1992 | Germany . |
| 4319955 A1 | 1/1994 | Germany . |
| 4225218 A1 | 2/1994 | Germany . |
| 1623559 A3 | 1/1991 | U.S.S.R. . |
| 848870 | 9/1960 | United Kingdom . |

OTHER PUBLICATIONS

Patent Abstracts of Japan, M–1112, May 14, 1991, vol. 15, No. 186, "Seat Belt Retractor with Pre-Tensioner" by Tetsuo Tsuji.

Leuger Lexicon of Technology 4th Edition, vol. 1, p. 460, Fundamentals of Machine Construction, "Operation Couplings", dated Aug. 29, 1960.

Primary Examiner—John M. Jillions
Attorney, Agent, or Firm—Fitch, Even, Tabin & Flannery

[57] ABSTRACT

A belt tensioner for safety belt arrangements in motor vehicles has a holder (11) on which are provided a belt winding reel (12) with a safety belt (13) coiled thereon, a blocking arrangement and an additional drive (15) connected via clutch (20) to the belt winding reel (12). The additional drive (15) contains a pressure source (16) which abruptly builds up a high pressure in a pressure chamber on being triggered and also contains a torque generating device (18) acted on by the pressure in the pressure chamber (17) and a drive shaft (19) connected to the latter. The drive shaft (19) is rotationally fixedly connectable to the belt winding reel (12) via the clutch (20). The torque generating device (18) includes a flexible draw band (21) which is secured at one end at a first mounting point (25) to the periphery of the drive shaft (19) or to the drive reel (22) concentrically mounted thereon and is partially wound onto the drive shaft (19), or onto the drive reel (22) and is secured at the other end, at a second mounting point (26) to the peripheral wall (30) of a band running chamber (23) within a housing (24). Pressure applied to the draw band causes belt tensioning movement of the drive shaft (19) or drive reel (22).

6 Claims, 15 Drawing Sheets

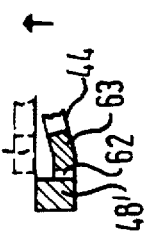
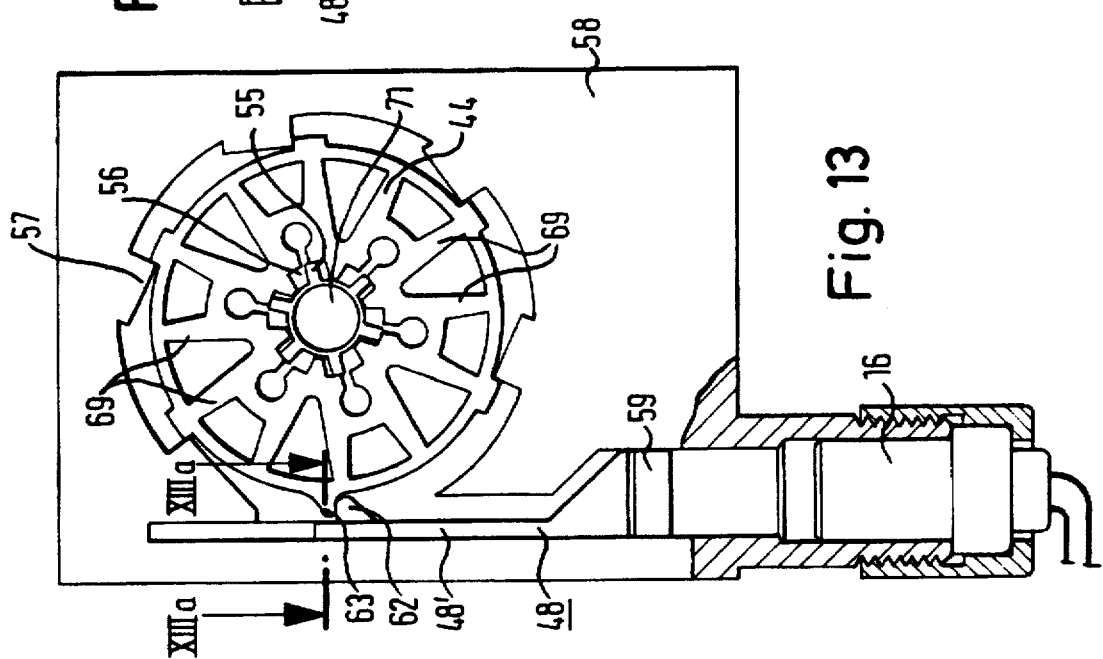
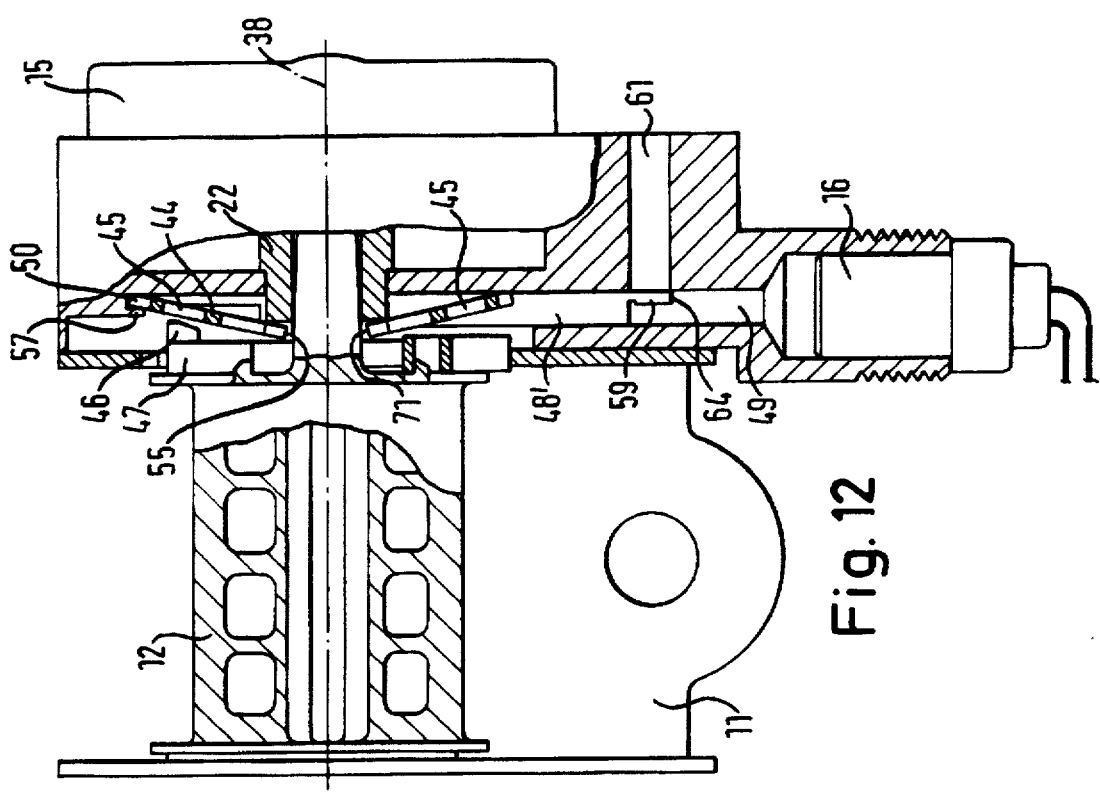

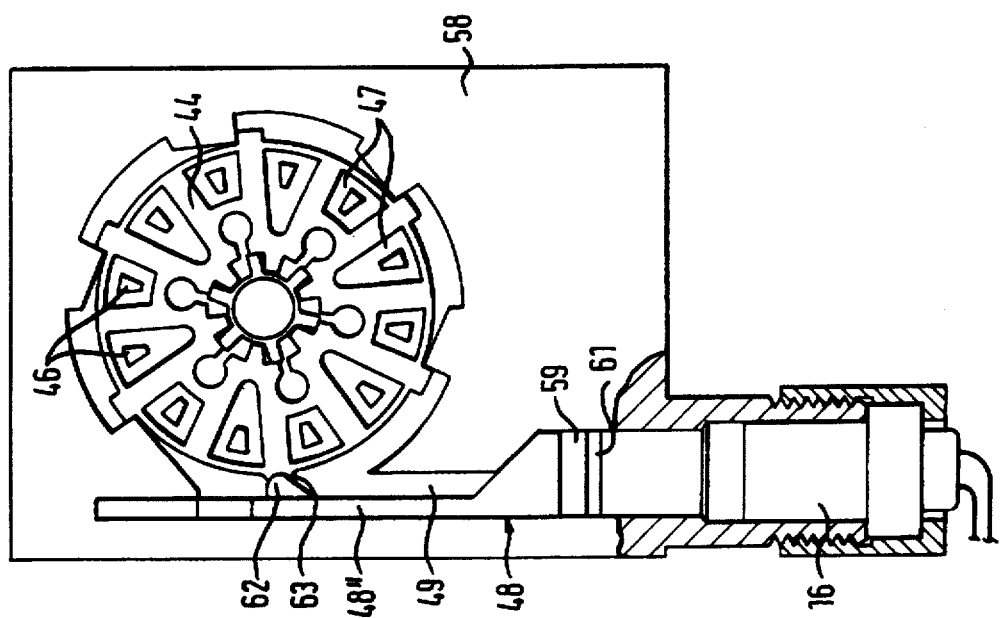
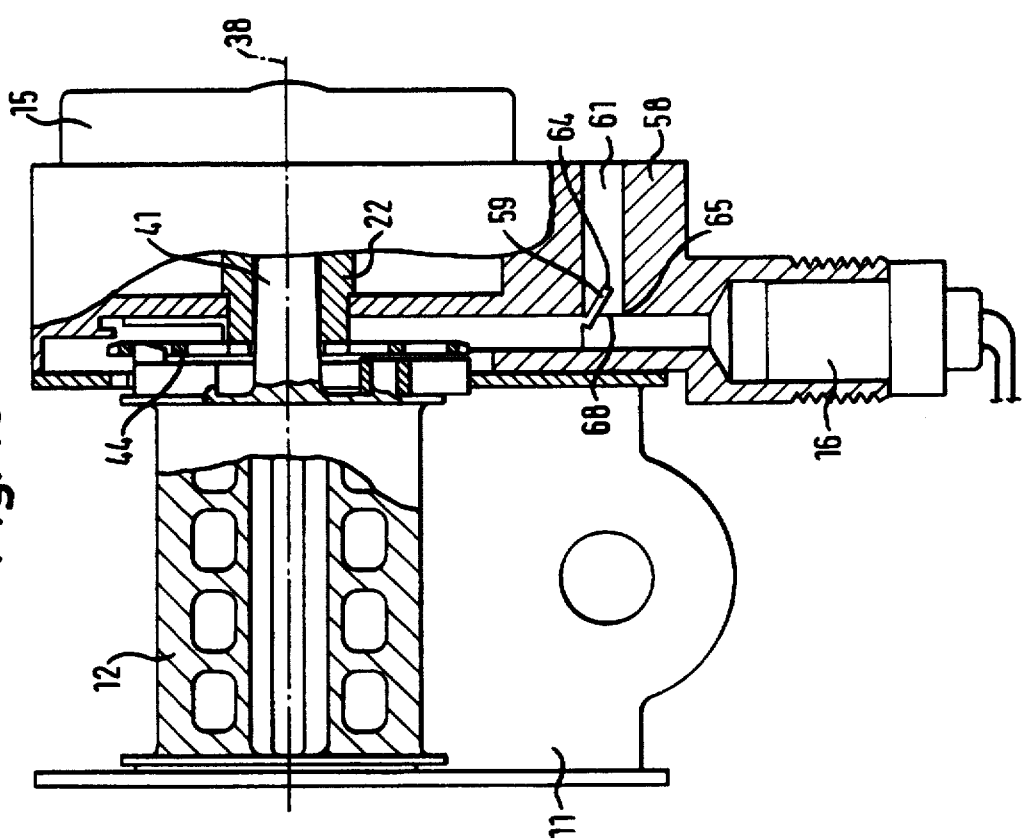

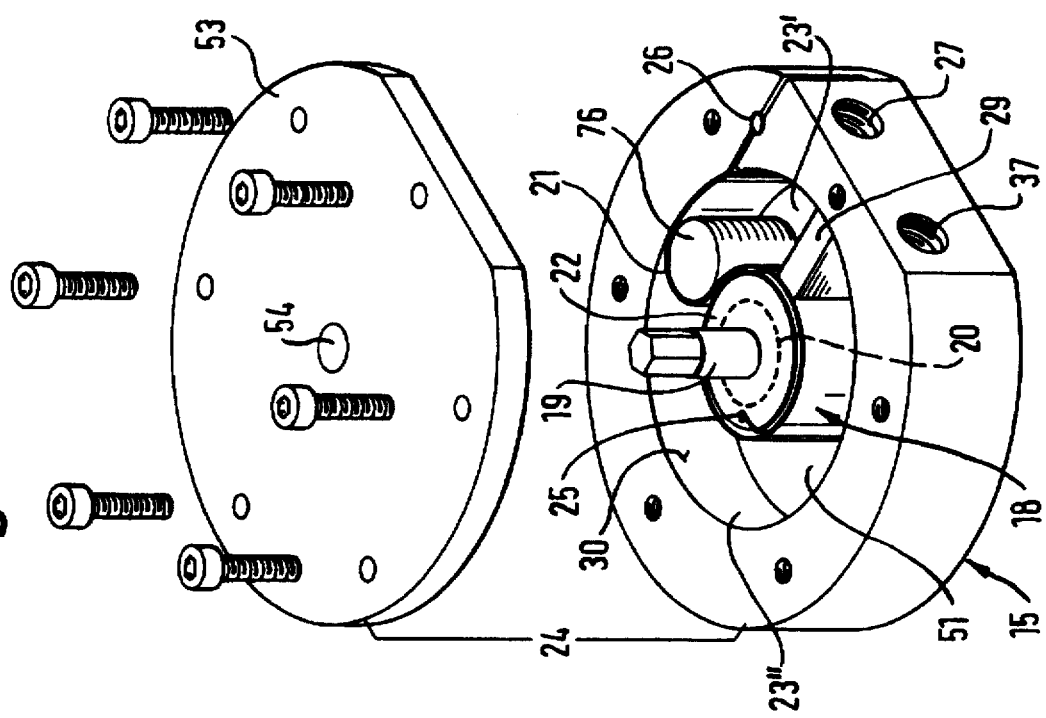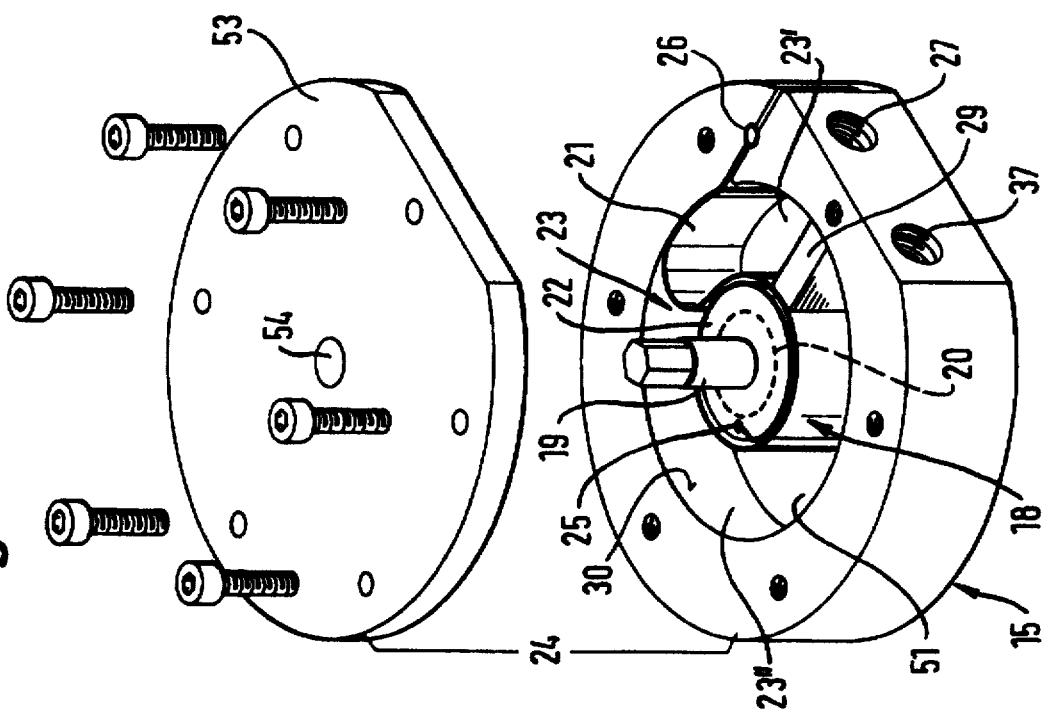

BELT TENSIONER FOR SAFETY BELTS FOR MOTOR VEHICLES

This is a division, of application Ser. No. 08/381,777, filed Feb. 1, 1995, now U.S. Pat. No. 5,553,803.

The invention relates to a belt tensioner for safety belt arrangements in motor vehicles having a holder which is to be secured to the vehicle chassis and on the holder a belt winding reel with a safety belt wound thereon, a retraction spring arrangement by means of which the safety belt is continuously and lightly so pretensioned in the retraction direction that it only lies loosely on the vehicle occupant secured by it, a blocking arrangement, in particular between the belt winding reel and the holder of the vehicle chassis which blocks the safety belt against being pulled out if suddenly pulled, and/or in the event of an acceleration resulting from an accident, and an additional drive connected to the belt winding reel via a clutch, wherein the additional drive is normally separated drivewise from the belt winding reel by the disengaged clutch, but is abruptly activated in the event of an acceleration resulting from an accident and is rotationally fixedly coupled with the belt winding reel via the then engaged clutch in order, before the vehicle occupant falls into the safety belt, to wind up such a length of the safety belt that the safety belt lies tightly on the vehicle occupant, with the additional drive (15) preferably having a pressure source, in particular a pyrotechnical pressure source, which can be triggered or ignited by the accident dependent response of an acceleration sensor and which, on being triggered, abruptly builds up a high pressure in a pressure chamber, a torque generating device which is energised by the pressure in the pressure chamber and a drive shaft connected to the torque generating device which can be rotationally fixedly connected with the belt winding reel via the clutch.

A torque generating device for belt tensioners is already known from the German laying open print 25 05 626 which is equipped with a drive wall which extends radially between the drive reel and the peripheral wall of the housing and which, together with a sealing wall which extends radially inwardly from the housing to the drive reel, forms a pressure space in which a drive pressure can be built up by a pyrotechnical charge, with the drive pressure acting on the drive wall which is connectable with the drive reel and which thereby sets the drive reel rotating.

Problematic with this known torque generating device is the fact that the largest angle through which the drive reel can move through is somewhat smaller than 360° because the drive wall strikes against the sealing wall after somewhat less than one revolution of the drive reel. Moreover, the drive wall must be radially displaceably arranged because it must cooperate with a drive shaft which is expensive to manufacture and is provided with a toothed arrangement at its periphery. The manufacture of the known torque generating device is thus complex and expensive and, moreover, not sufficiently operationally reliable.

The dimensioning of the individual components should generally be such that a minimum tensioning length of the belt of 140 mm is achieved. Preferably a certain additional draw in length should however be available so that the belt can be drawn in or tensioned by the belt tensioner, for example by a maximum of 205 mm. This is not possible with the known belt tensioner.

After the tensioning the pressure which is generated by the pyrotechnical charge for only a short period of time generally drops off whereupon the tensioning of the belt brought about by the vehicle occupant falling into the belt triggers the blocking device and the vehicle occupant is reliably held by the now tensioned belt.

The object of the present invention is to provide a belt tensioner of the initially named kind in which the drive shaft or the drive reel, as a result of suitable dimensioning, can also be rotated through more than 360° in the event of triggering of the pressure source as a result of an acceleration of the vehicle caused by an accident.

A further object of the invention is to provide a torque generating device for a belt tensioner which can be manufactured with little cost and complexity and which is nevertheless extremely reliable in operation.

A further object of the invention is to provide a torque generating device for a belt tensioner which, in dependence on the angle of rotation of the drive shaft, makes a desired change of the drive torque possible, without the drive pressure being changed.

In order to satisfy this object the present invention provides that the torque generating device has at least one flexible tension band which in particular consists of spring steel and which is secured at one end at a first mounting point to the periphery of the drive shaft, or to the drive reel which is concentrically mounted thereon, and is partially wound onto the drive shaft, or onto the drive reel, and is secured at the other end at a second mounting point to the peripheral wall of a band running chamber which is arranged within a housing around the drive shaft, or around the drive reel and has a width corresponding to the width of the draw band in such a way that the draw band extends through the band running chamber while subdividing the band running chamber into two partial chambers sealed off relative to one another; and in that the partial chamber which on being subjected to pressure brings about an unwinding of the tension band from the rotating drive shaft or drive reel is connected to the pressure space and with the other partial space is preferably vented; and in that, for the pressure-wise decoupling of the partial chambers, at least one sealing wall is provided which extends between the housing and the periphery of the flexible draw band which is wound onto the drive shaft, or onto the drive reel concentrically mounted thereon.

In this manner the entire free-hanging length of the draw band extending between the drive shaft of the drive reel and the peripheral wall is available for the action of pressure and thus for the generation of force. By suitable choice of the diameter of the drive shaft or the drive reel and the surrounding housing the reel or drive shaft can turn through a substantially larger angle than 360° on triggering of the torque generating device.

In accordance with a first advantageous embodiment provision can be made that the flexible draw band reverses its direction of curvature after lifting away from the drive shaft or the drive reel and contacts the peripheral wall of the housing with this reversed direction of curvature.

It is however particularly preferred, when the flexible draw band extends through the band running chamber up to its peripheral wall with the same sense of curvature as it has as a result of being wound onto the drive shaft or onto the drive reel.

This embodiment brings the advantage that the area of the flexible draw band which is acted on by the pressure from the pressure chamber is substantially enlarged since the explosion pressure lifts the first band layer on the drive shaft or drive reel up to the sealing wall and thus acts on the draw band up to this point, so that with the same explosion pressure a substantially larger area of the draw band is acted on and thus the correspondingly larger tension force is transmitted to the flexible draw band. The wall surface enlargement corresponds, with only one partial chamber pair, essentially to the entire drive shaft or drive reel periphery and with several partial chamber pairs essentially to that part of the drive shaft or drive reel periphery which extends between the adjoining sealing walls. Thus, practically the entire band area is available for the action of pressure from the position where the flexible draw band lifts off from the peripheral wall up to the sealing lip of the sealing wall. The invention can already be advantageously used with only a single flexible draw band.

A particularly preferred embodiment is characterised in that the sealing wall or walls has or have a sealing lip facing the outer surface of the coiled up draw band and so extends or extend relative to the housing, and is or are so flexibly or hingedly designed or arranged, that the pressure in the associated pressure chamber sealingly presses the sealing lip against the outer surface of the coiled up tension band. In this way the sealing wall and in particular the sealing lip are pressed by the pressure in the associated pressure chamber against the outer periphery of the draw band wound onto the drive shaft or drive reel and thus a pressure dependent, i.e. particularly effective pressure action is produced. The greater the explosion pressure the better is the seal.

It is already known (EP 0 581 288 A1) that with such belt tensioners a clutch is arranged between the additional drive and the belt winding reel which is normally disengaged and which is first engaged directly prior to the additional drive becoming active in the case of an acceleration brought about by an accident. A clutch of this kind is also represented by the radially displaceable drive wall of the abovementioned DE-OS 25 05 626.

A further object of the invention is to make available a particularly advantageous design of a clutch of this kind which can be used in particular in connection with the torque generating device of the present invention which has one or more draw bands.

In order to satisfy this object the invention provides that the clutch can be engaged by the pressure generated by the triggering of the pressure source and the additional drive is separated from the pressure source by a valve arrangement until the clutch has engaged.

For this arrangement it is particularly advantageous if the clutch has a first clutch part, in particular a clutch disk which is rotationally fixedly connected with the additional drive or with the torque generating device, and a second clutch part, in particular a counter-disk which is rotationally fixedly connected to the belt winding reel and is preferably formed by the one end guide disk of the belt winding reel. In this arrangement provision is in particular made that the first coupling part is at least partially axially displaceable in order to be able to engage with the counter-disk; and that the first clutch part can be brought into engagement with the second clutch part by a spring force but is held against the spring force until triggered.

It is particularly preferred for the first clutch part to be a clutch disk which is biased by a spring force towards the counter-disk; for the clutch disk to be preferably held at its outer periphery by a bayonet closure connection in a disengaged position against spring force; and for the bayonet closure to be releasable by relative rotation of the clutch housing and of the clutch disk. In particular it is furthermore expedient if the coupling disk is itself of resilient design and consists in particular of spring sheet steel and is stressed in the normal state between its center and its outer periphery to an essentially conical shape in such a way that the clutch is disengaged and if, on cancelling the stressing, for example through the release of the bayonet closure, the coupling disk is returned to its normal position, in particular to its planar normal position in particular as a result of rotation of the bayonet connection, and thereby enables the engagement for the clutch to engage.

A particularly preferred embodiment provides that the clutch has a slider which is displaceable by the pressure of the pressure source and which brings about the engagement of the clutch on displacement by the pressure of the pressure source.

In particular provision should be made that the slider has a piston region acted on by the pressure of the pressure source and, at the side remote from the pressure actuation, a preferably thinner actuating rod which cooperates via an abutment projecting laterally sideways from it with a counter-abutment provided at the periphery of the coupling disk in such a way that on advancing the actuating rod in the case of pressure loading of the piston region the clutch disk is turned through such an angle that it is rotated out of the disengaged blocking position into a position in which the spring force can bring the clutch disk into engagement with the counter-disk, in particular with the guide disk of the belt winding reel.

It is of particular advantage when, in a first stage of the rotary movement of the clutch disk brought about by the slider, the holding noses released from the counter-noses on the clutch housing at the periphery of the clutch disk and, in a second stage of the rotary movement—in so far as the engagement noses have, in the first stage, not yet entered into engagement with the engagement cut-outs—the clutch disk is turned further by the advanced slider until the engagement cut-outs of the clutch disk have come axially into alignment with the engagement noses of the counter-disk, whereupon the resilient clutch disk snaps over the engagement noses.

The concept of the invention of this further embodiment is thus to be seen in that, by suitable guidance of the pressure gases which are made available from a pressure source, these can first be used to engage the clutch and only subsequently to actuate the additional drive.

It is important that on rotation of the clutch disk for the engagement of the clutch relative to the drive shaft, or to the drive reel of the torque generating device, an adequate clearance is available so that the clutch disk can rotate without transferring a torque to the drive shaft or to the drive reel, until the engagement of the clutch has taken place.

In order to ensure this, provision is made, in accordance with the invention, that a peripheral clearance is present between the drive shaft, or the drive reel, and the clutch disk, such that, on rotation of the clutch disk contrary to the belt retraction direction, the bayonet closure is first opened and then a further rotation of the clutch disk is possible until the engagement cut-outs snap over the engagement noses, in so far as this alignment was not already present on opening of the bayonet closure.

Figure 2:
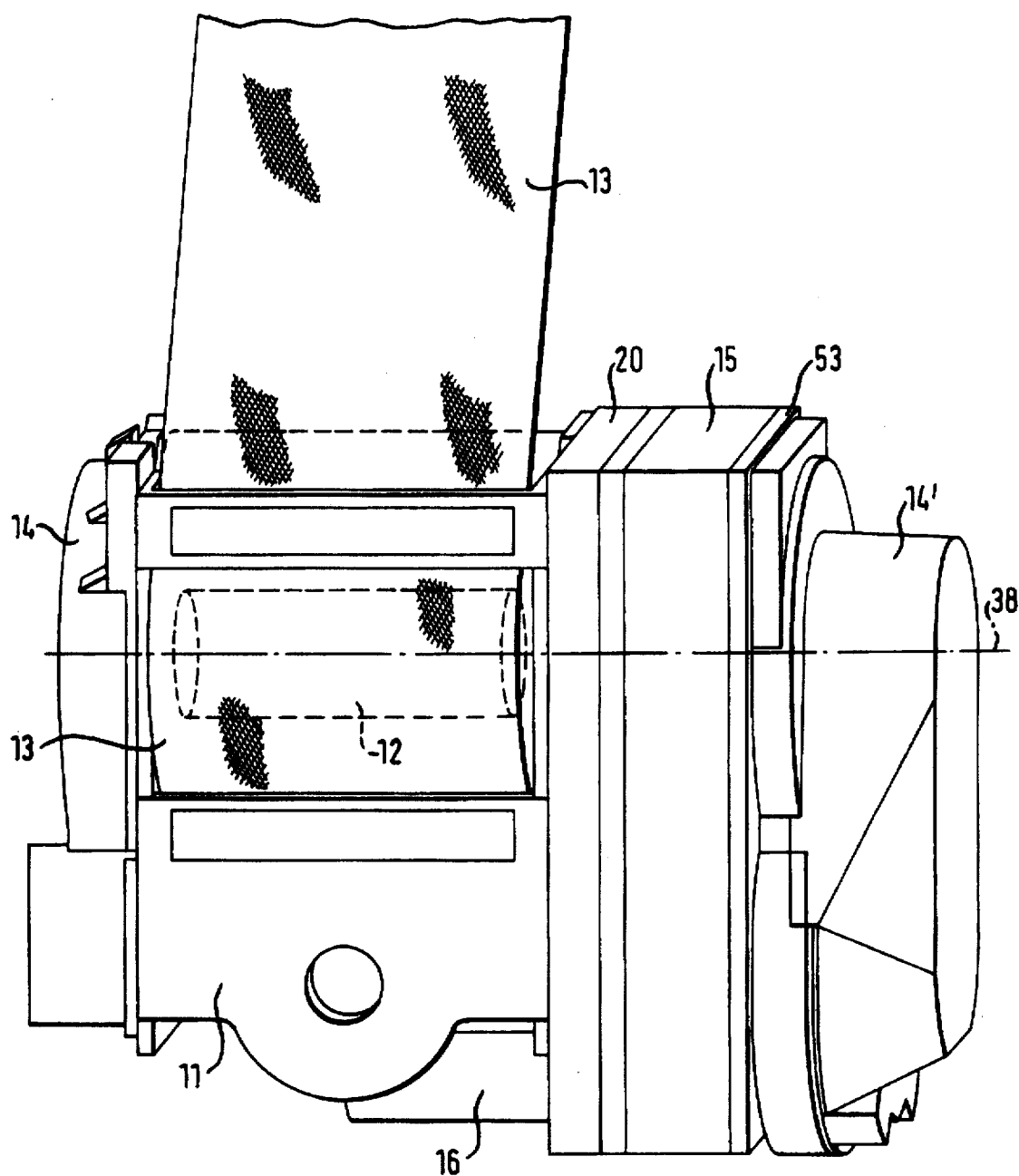
Figure 3:
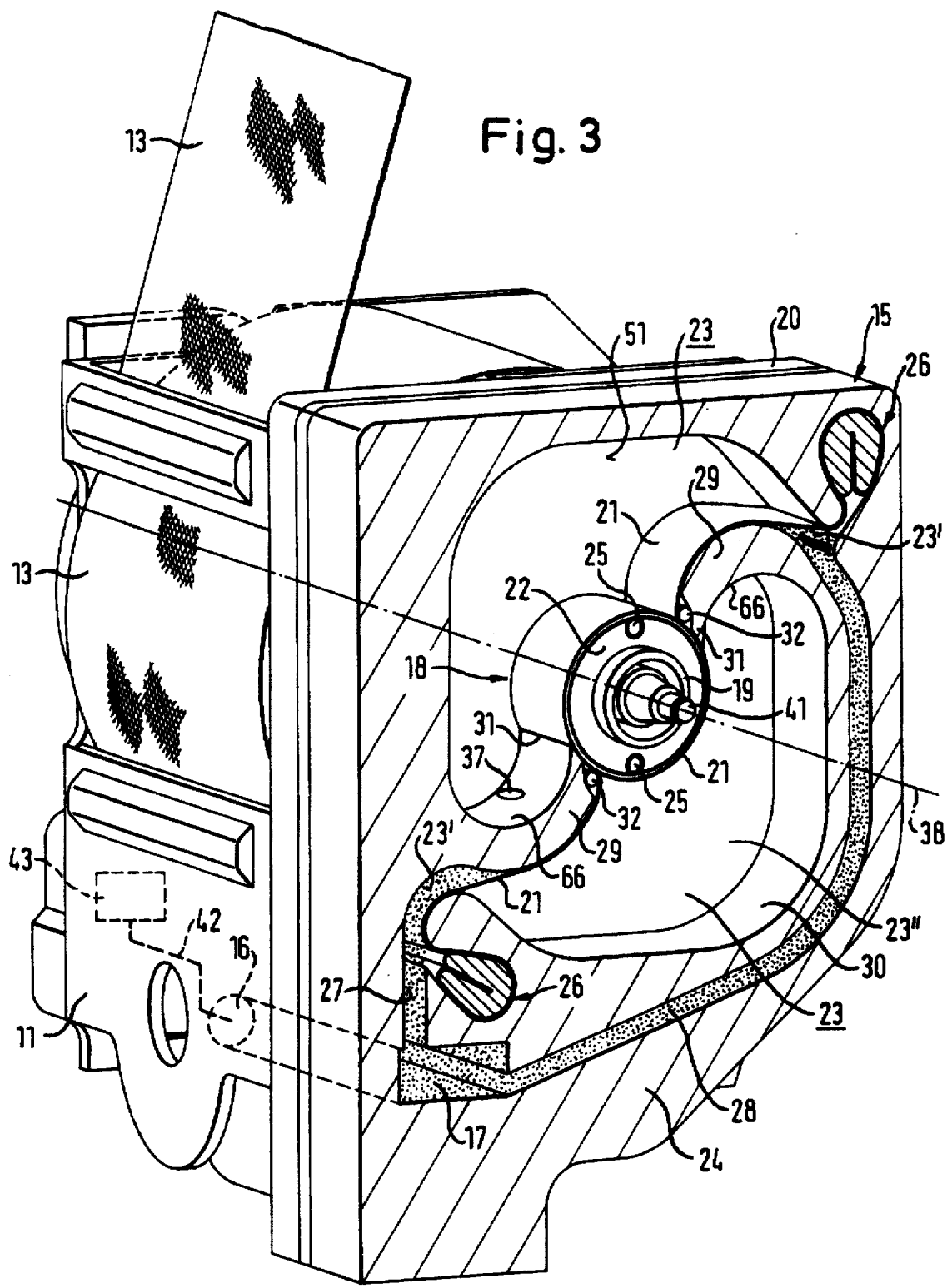
Figure 4:
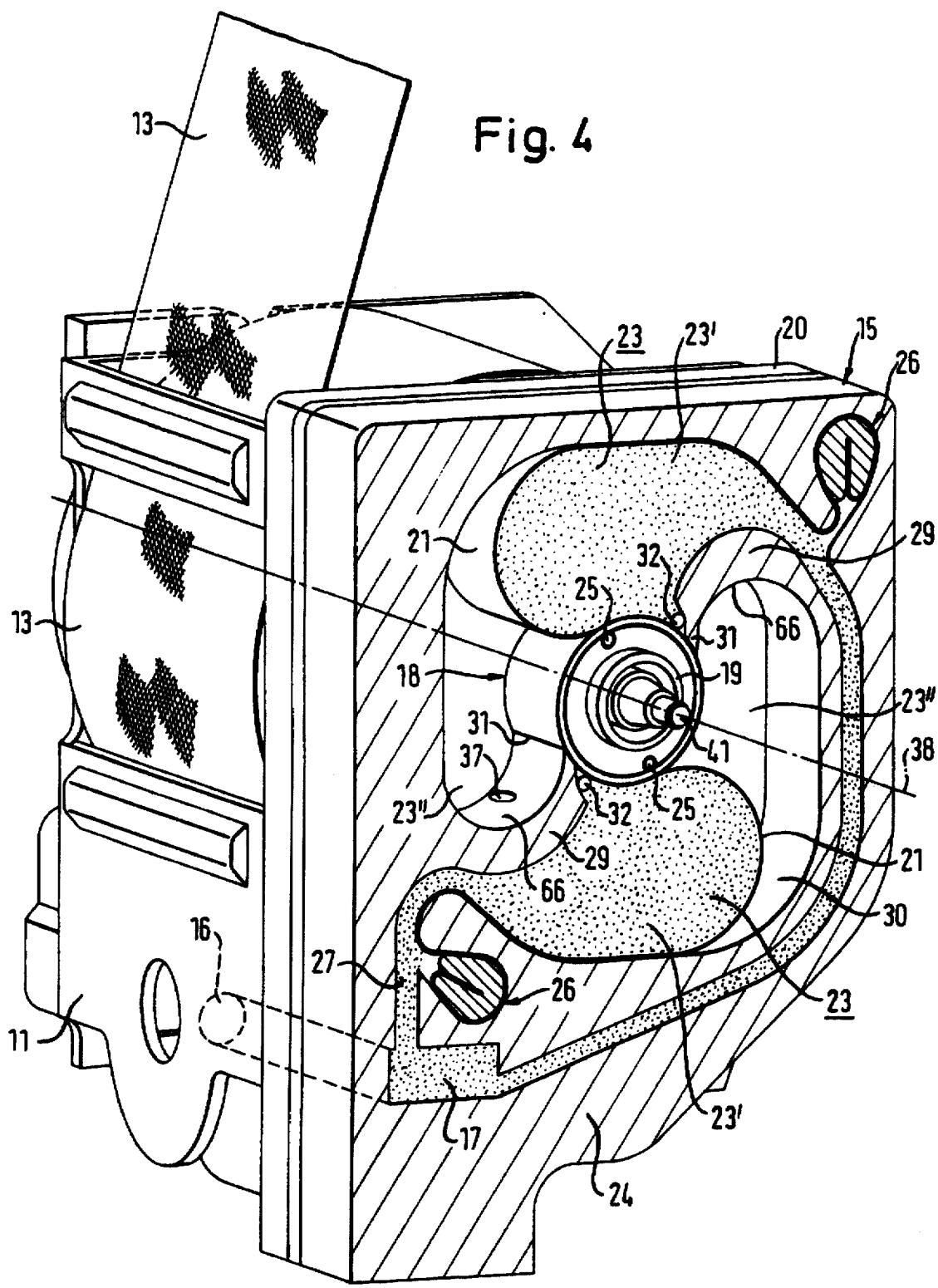
Figure 5:
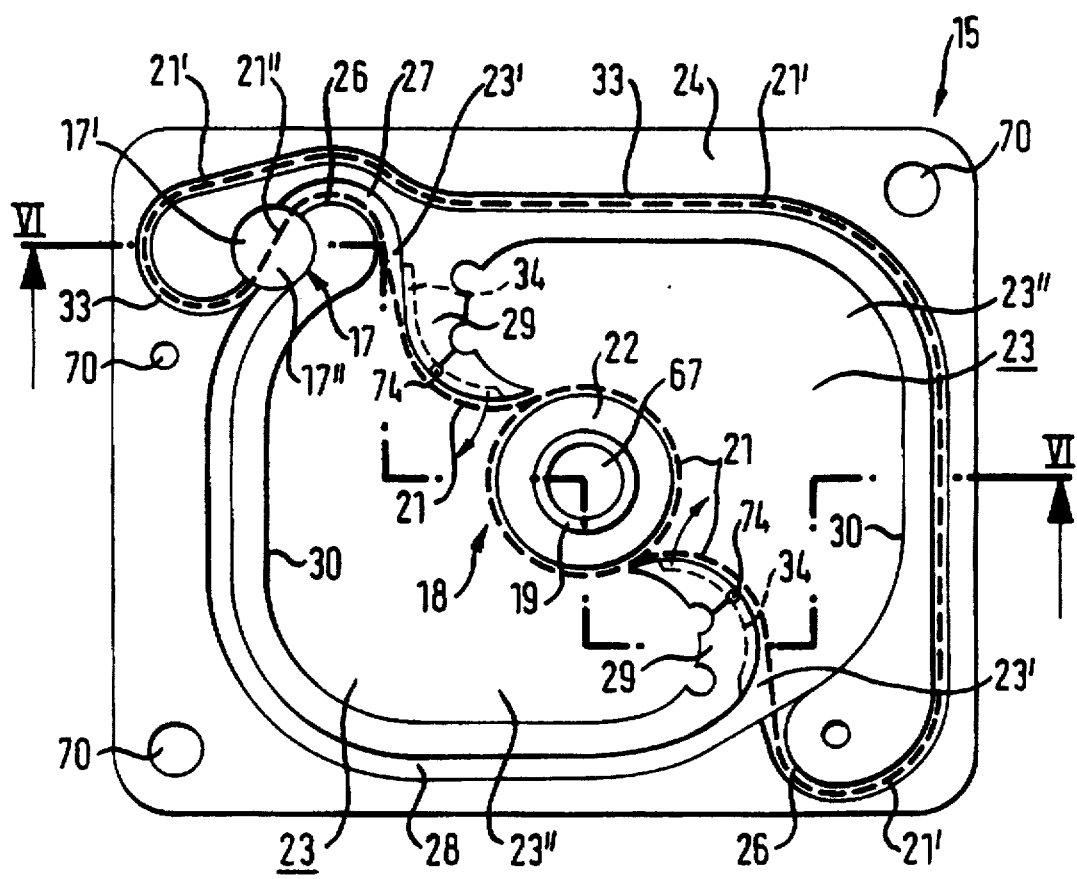
Figure 6:
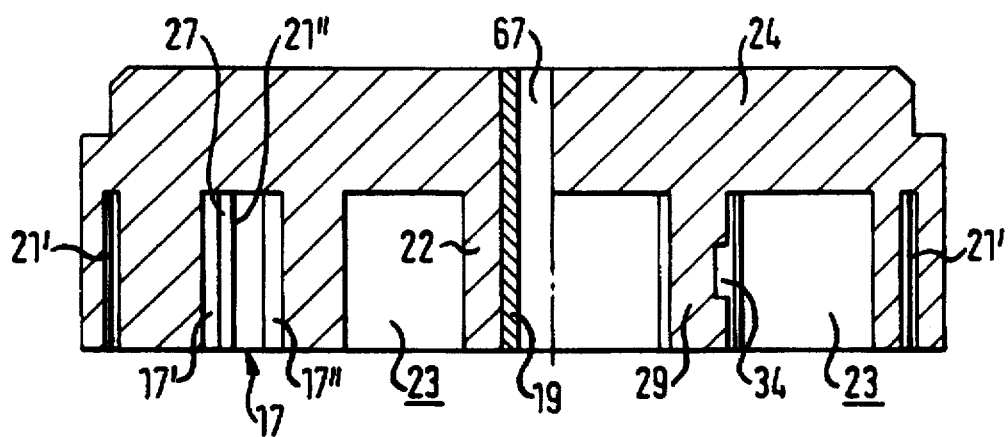
Figure 5A:
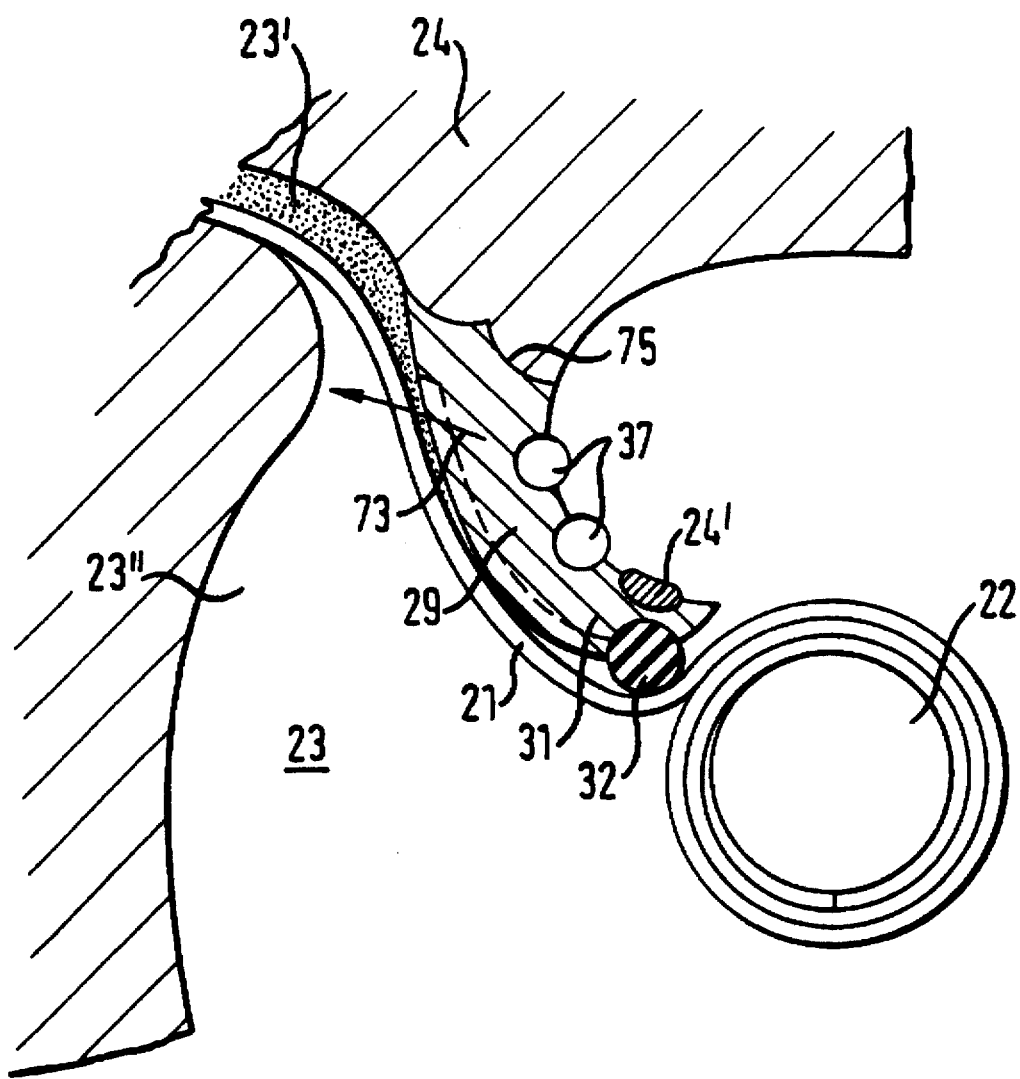
Figure 8:
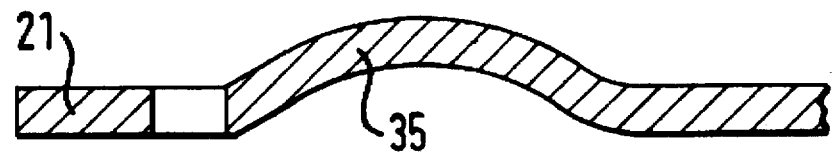
Figure 7:
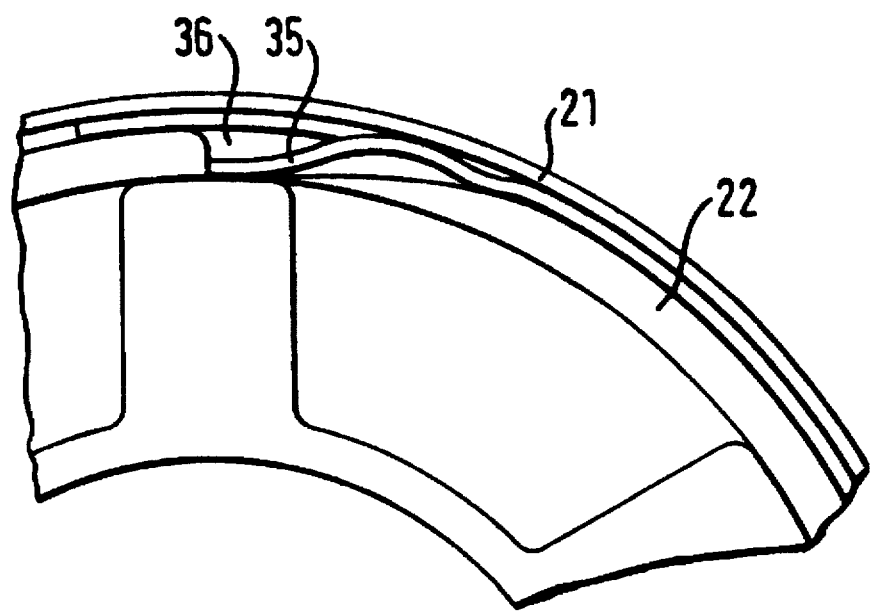
Figure 9:
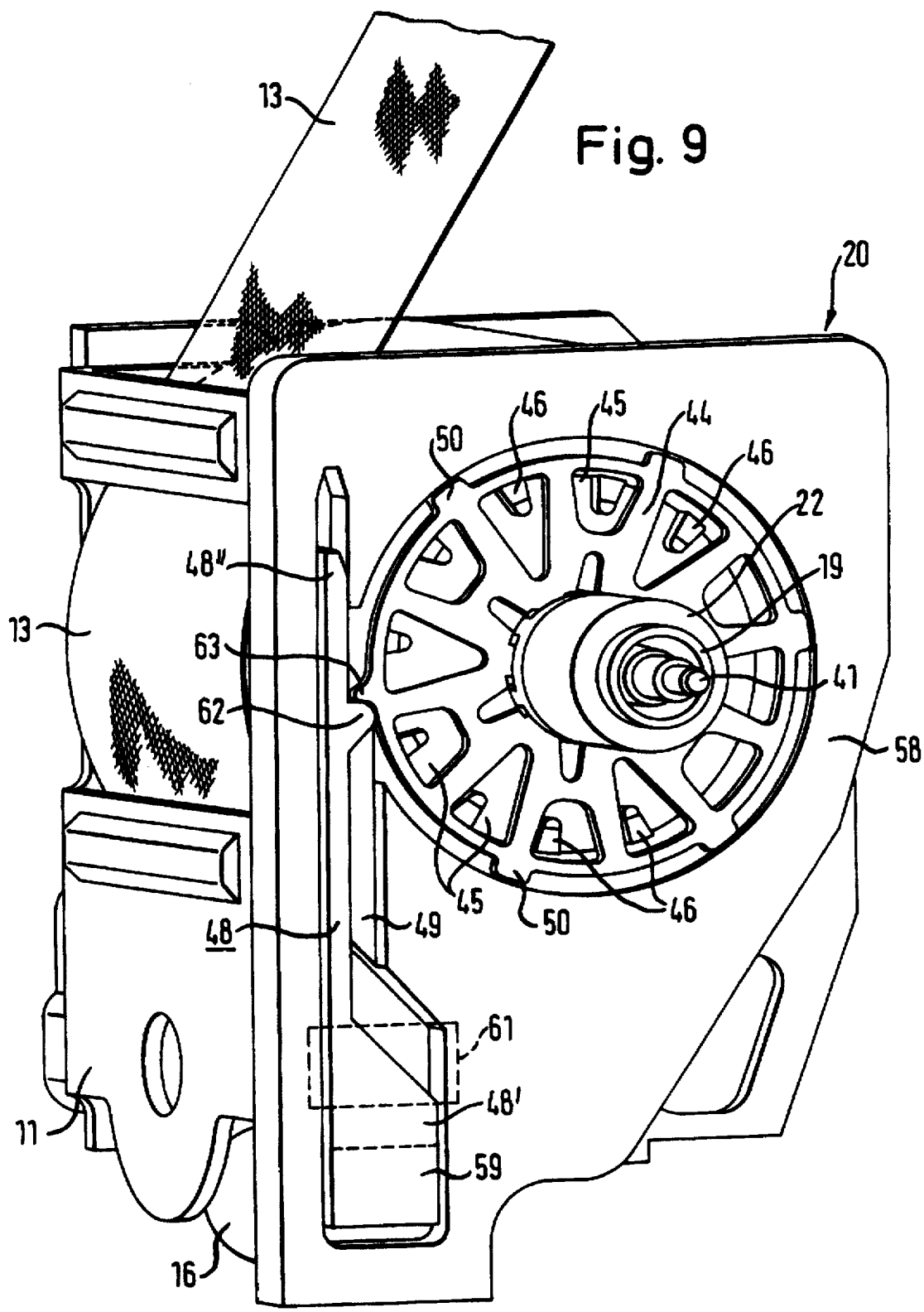
Figure 10:
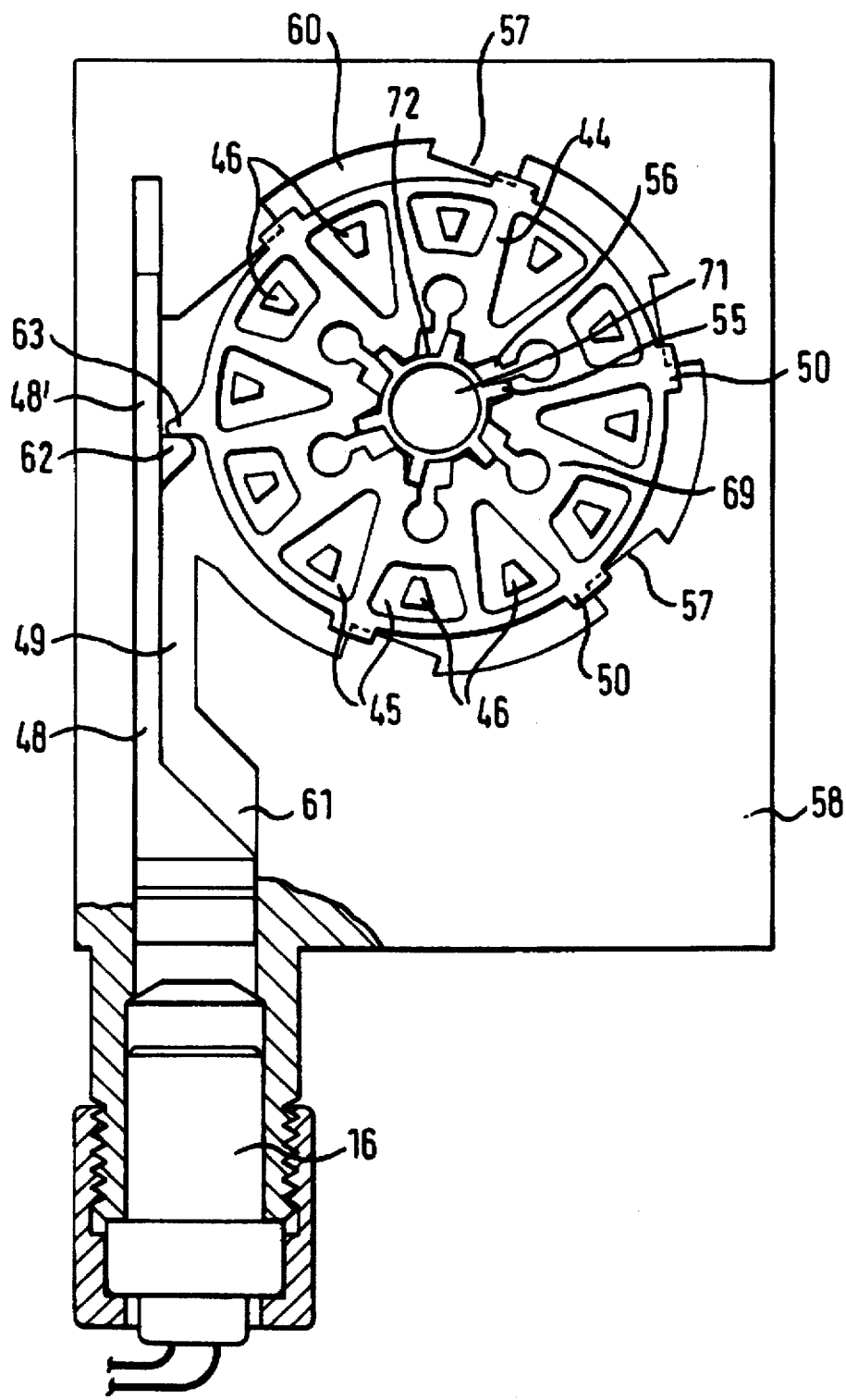
Figure 11:
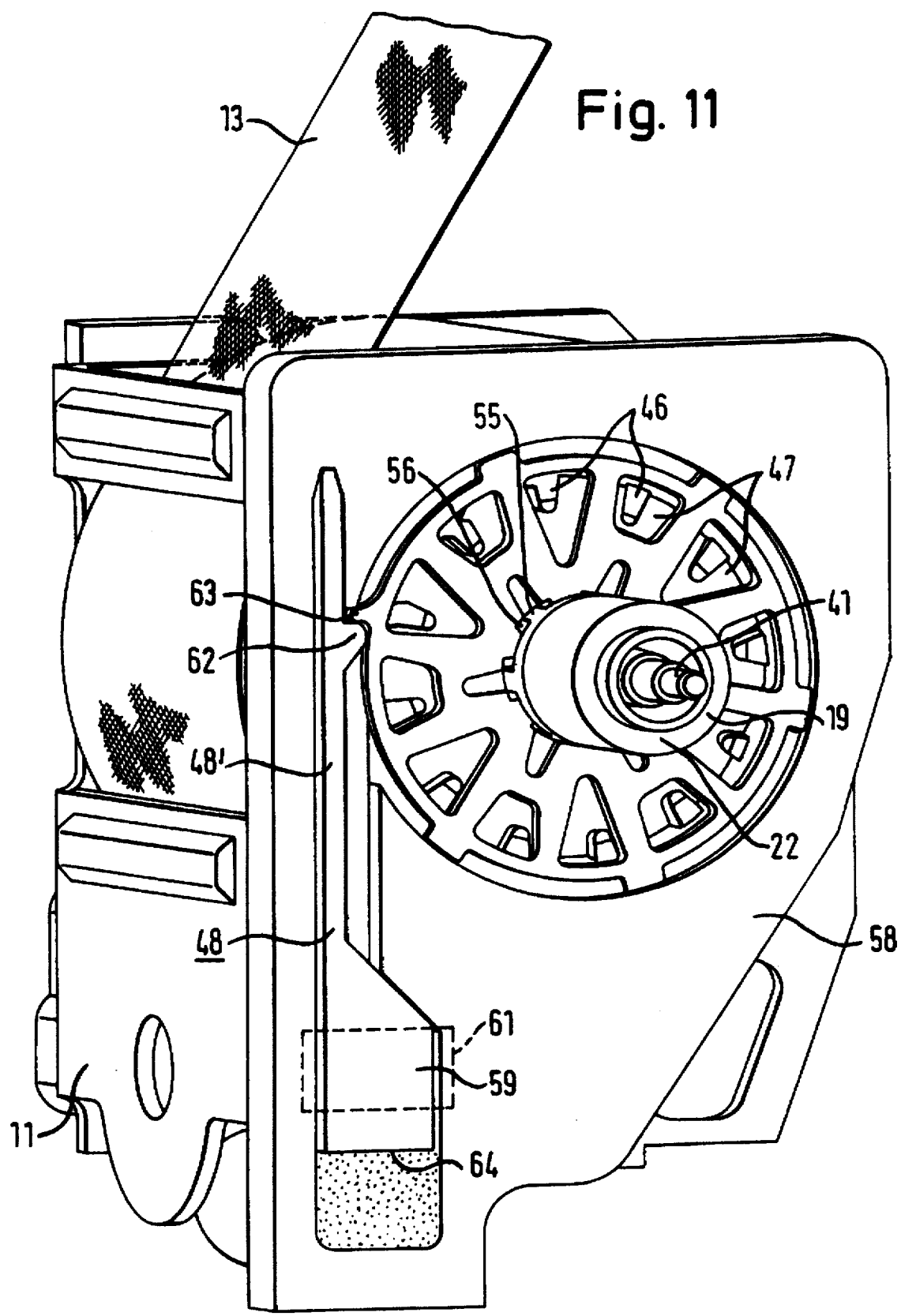

The invention will now be described in the following by way of example only and with reference to the drawings in which are shown:

FIG. 1 a first embodiment of a belt tensioner which operates with an ignitable pyrotechnical charge as seen in a perspective exploded illustration, FIG. 2 a somewhat enlarged perspective illustration of the same embodiment of a belt tensioner in the assembled state as seen in perspective view from the opposite side to that in FIG. 1, FIG. 3 a perspective view of the same article seen more from the side of the additional drive in which, however, for the purpose of illustration, the one end face cover of the band running space and the retraction spring arrangement have been omitted, with the view being shown in the initial position directly after the start of ignition of the pyrotechnical charge, FIG. 4 a corresponding view to that of FIG. 3 but during a belt tensioning process which is already underway, FIG. 5 an end view of a further preferred embodiment of a housing of a belt tensioner containing a band running space with the end cover removed, FIG. 5a an enlarged section from FIG. 5 with another embodiment of the releasable mounting of the sealing walls to the housing, FIG. 6 a section on the line VI—VI in FIG. 5, FIG. 7 an enlarged end view of a section of a preferred embodiment of the drive reel of a belt tensioner in accordance with the invention in the region of the draw band mounting point, FIG. 8 an enlarged section of the end region of a draw band provided with a spring tongue for mounting in a peripheral recess of the drive reel of FIG. 7, FIG. 9 a perspective view of the belt tensioner of the invention analogous to FIGS. 3 and 4 but with the additional drive apart from the drive shaft and the drive reel being omitted in addition to the retraction spring arrangement, whereby the interior of the clutch can be recognised, with the clutch being shown in the normal disengaged state, FIG. 10 an axial view of a similar embodiment of the clutch and of the drive means provided for it as likewise seen in the disengaged position of the clutch, FIG. 11 a similar perspective view to that of FIG. 9 but during the engagement procedure of the clutch, FIG. 12 a partial longitudinal section of the embodiment of FIG. 10 but with the belt winding reel being additionally shown, FIG. 13 an end view of the subject of FIG. 12 with the additional drive removed, but with the clutch of this embodiments also being illustrated during the engagement procedure, and indeed shortly before the release of the resilient clutch disk, FIG. 13a a section on the line XIIIa—XIIIa in FIG. 13.

Figure 14:
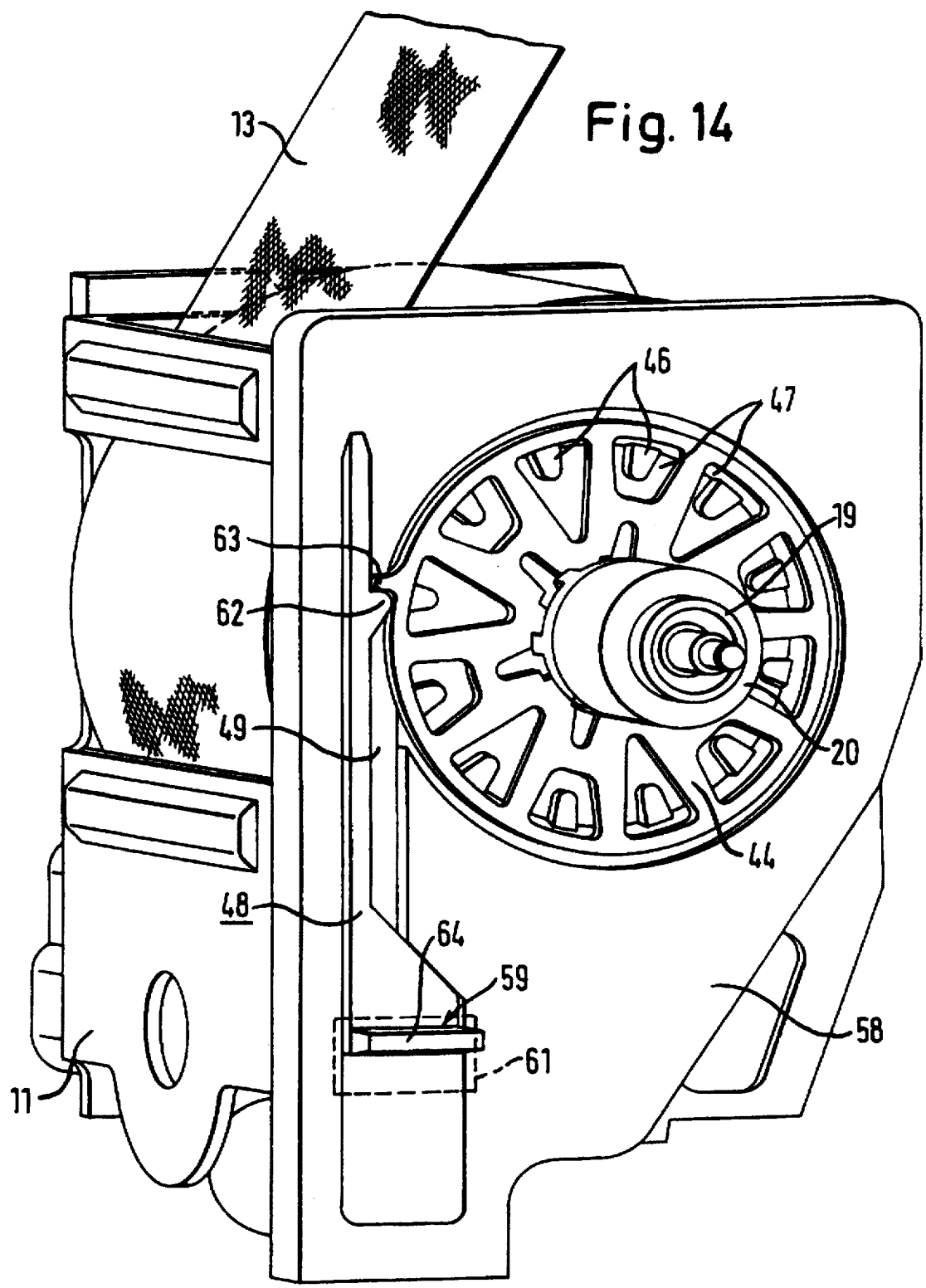
Figure 17:
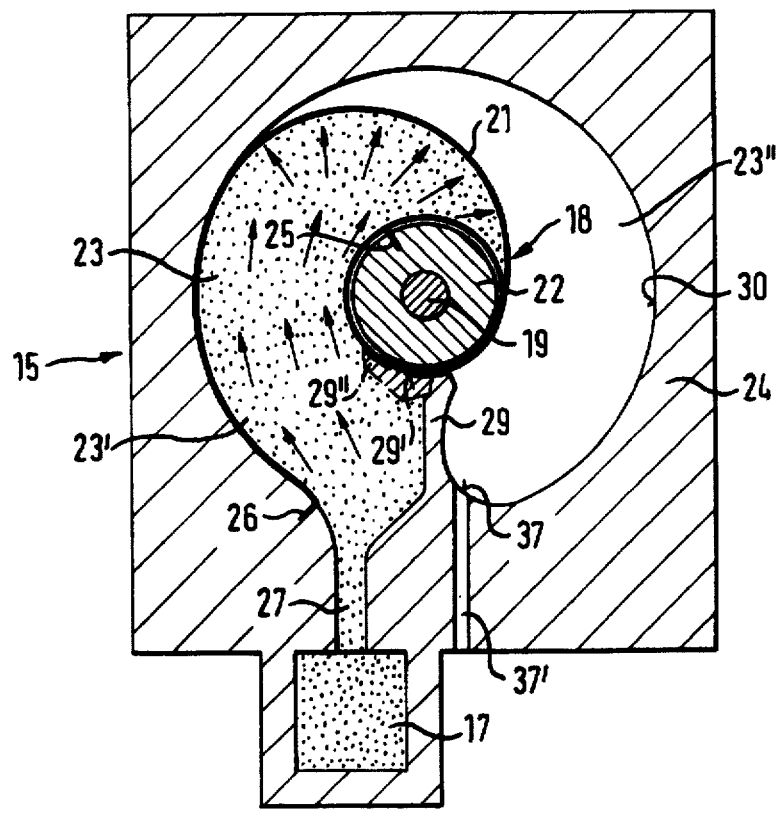
Figure 18:
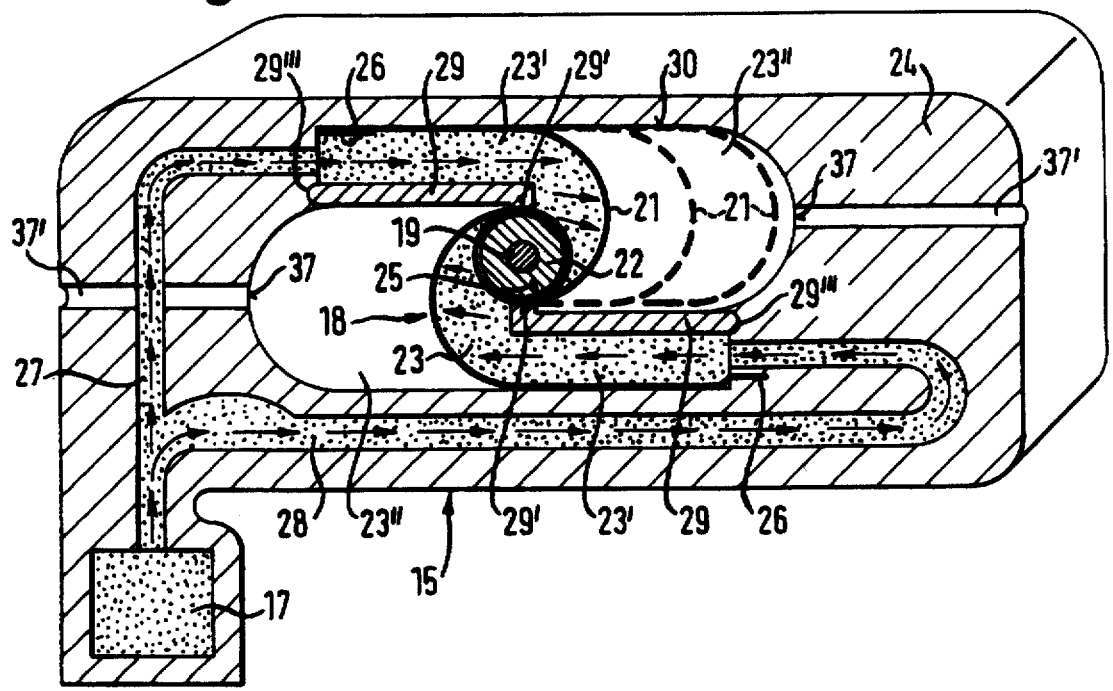

FIG. 14 a similar perspective view to that of FIGS. 9 and 11, but with the clutch being shown in the fully engaged state and the valve arrangement in the change-over position for actuation of the torque generating device, FIG. 15 is a partial longitudinal section analogous to that of FIG. 12 but with the clutch disk being reproduced in the fully engaged state, FIG. 16 an end view of the clutch of FIG. 15, FIG. 17 a schematic sectional view of an additional drive in accordance with the invention analogous to FIG. 5 but with only a flexible draw band, FIG. 18 a schematic sectional view analogous to FIG. 17 of an embodiment of the present invention with two flexible draw bands, FIG. 19 a perspective view of a particularly simple embodiment of a torque generating device for a belt tensioner in accordance with the invention, with only one oppositely curved draw band and with the cover removed, and FIG. 20 a similar perspective view of that of FIG. 19 but with a sealing element being mounted in the region of curvature of the "through-handing" draw band.

In accordance with FIGS. 1 and 2 a belt tensioner has a holder 11 which is for example to be mounted in the floor region of a passenger compartment to the vehicle chassis 40. A belt winding reel 12 is rotatably mounted on the holder 11 about a central axis 38 and a safety belt 13 is wound onto the belt reel 12. The safety belt extends in the manner shown only in broken lines in the FIG. 1 via a belt lock 39 and for example a wire cable 13' to another side of the vehicle chassis 40 with the safety belt 13 normally being in contact with the non-illustrated body of a vehicle occupant. Furthermore, FIG. 1 indicates in chain-dotted lines at the top right that the safety belt 13 can also be an element of a three point belt arrangement.

At the one end face of the belt winding reel 12 there is located a customary retraction spring arrangement 14 in which a non-illustrated retraction spring is provided which exerts a light belt draw-in torque on the belt winding reel 12 so that the safety belt which has been pulled out and put on by the vehicle occupant rolls up onto the belt winding reel 12 to such an extent that it loosely contacts the body of the vehicle occupant.

Furthermore, a customary but not illustrated belt pull-out blocking mechanism is in particular provided between the holder 11 and belt winding reel 12 and becomes active with sudden pull on the safety belt 13 or during accelerations caused by an accident and fixes the belt winding reel in the then prevailing pulled out or drawn in position so that pulling out of the safety belt 13 is prevented.

The retraction spring arrangement can also be provided at the end face of the belt winding reel 12 or at the holder 11 having the reference numeral 14' in FIGS. 1 and 2. For this purpose an inner shaft 41 in FIG. 1 must extend rotatably through a corresponding central bore of an additional drive 15 and a clutch 20 which have yet to be described in detail in the following. The arrangement of the retraction spring arrangement at 14' has the advantage that both the normal drive of the belt winding reel 12 and also the additional drive of the belt running reel 12 take place from the same end face.

In accordance with FIGS. 1 and 2 an additional drive 15 and a clutch 20 are arranged between the retraction spring arrangement preferably arranged at 14' and the holder 11 or the belt winding reel 12 and will be described in the following in detail with reference to FIGS. 2 to 8.

As seen in FIGS. 1 and 3 the additional drive 15 as a drive shaft 19 coaxial to the axis of rotation 38 of the belt winding reel 12 on which a drive reel 22 is concentrically and rotationally fixedly secured. In the view of FIGS. 1 and 3 two draw bands 21 of spring steel sheet of approximately 0.2 mm thickness are wound onto the drive reel 22 above one another in the counter-clockwise sense and are rotationally fixedly secured to the drive reel 22 at mounting points 25 on the periphery of the latter.

In the starting position shown in FIGS. 1 and 3 there are in each case three to four layers of each draw band 21 wound onto the drive wheel 22. Thereafter each draw band 21 extends in arcuate manner through a respective one of the two band running chambers 23 which surround the drive reel 22, to a respective mounting point 26 at the peripheral wall 30 of the housing surrounding the band running chambers.

The arcuately shaped part of the draw bands 21 lies with its concave surface in the starting position of the belt tensioner shown in FIG. 3 against sealing walls 29 which are of curved shape in the radial direction, are formed in one piece with the housing 24 and extend in scythe-like manner essentially radially inwardly to the layers of the draw bands 21 wound onto the drive reel 22. There they form a tapered sealing lip 31 which ensures a sealed connection to the wound on draw bands 21.

In the region of the sealing lips 31 bar-like sealing elements 32 are arranged between each sealing wall 29 and the draw band 21 lying thereon and extend over the entire depth of the band running chambers 23 which have essentially planar end walls 51, 52. Whereas the planar end wall 51 which has the one central throughbore 67 and is positioned adjacent to the belt winding reel 12 forms a fixed component of the housing of the torque generating device 18 in the same way as the peripheral wall 30, the axially oppositely disposed end wall 52 of FIG. 1 is located on a lid 53 which can be mounted on the open side of the housing 24 and can also be secured to it. The lid 53 has a central bore 54 for the passage of the inner shaft 41 to the retraction spring arrangement 14'.

The width of the draw bands 21 is so large that they sealingly and slidingly contact the end walls 51, 52 and thus subdivide the band running chambers 23 into two partial chambers 23', 23" sealed relative to one another via the draw bands 21.

Branch lines 27 and 28 which respectively emerge from a common pressure chamber 17 energisable from a pressure source 16 open at the convex side of the sealing walls 29 in the region of the roots of the sealing walls 29 located at the peripheral wall 30. The pressure source 16 is connected via a control line 42 indicated in broken lines in FIG. 3 to an acceleration sensor 43 which is likewise only indicated in broken lines and which, in the case of a vehicle acceleration brought about by an accident, ignites a pyrotechnical charge in the pressure source 16 so that a pressure can be abruptly built up in the pressure chamber 17. Vent openings 37 which lead to the surrounding atmosphere are provided at the concave side of the sealing walls 29 and prevent an excessive pressure build up in the partial chambers 23" on triggering of the additional drive.

The branch lines 27, 28 open at the band running chambers 23 in such a way that they can exert pressure on the draw bands 21 which extend at the periphery of the band running chambers 23 transversely over the openings of the branch lines 27, 28.

Through the described arrangement a torque generating device 18 is formed which, on triggering of the pyrotechnical charge 16, drives the drive shaft 19, which is made hollow to receive the inner shaft 41, in the belt winding direction as will be explained further below in detail in the description of the manner of operation.

A clutch 20 which is described in the following with reference to FIGS. 1 and 9 to 16 is provided between the additional drive 15 with the torque generating device 18 and the belt winding reel 12 and is normally disengaged in order to ensure an unhindered interplay between the retraction spring arrangement 14' and the belt winding reel 12 via the inner shaft 41. Only when an accident dependent acceleration occurs and the torque generating device 18 is intended to abruptly tension the belt 13 must the clutch 20 engage in order to be able to transfer the torque to the belt winding reel 12.

In accordance with FIGS. 1, 9 and 10 the drive reel 22 is provided at its side axially remote from the torque generating device 18 with axially (FIG. 9) or radially (FIG. 10) projecting noses or wedge cams 55 which engage in peripheral slots 56 of complementary shape at the outer margin of the central bore 71 of a clutch disk 44 in such a way that in the peripheral direction a certain clearance admittedly exists between the noses 55 and the boundaries of the peripheral slots 56 but such that the drive reel 22 causes the clutch disk 44 to execute a rotary movement with it after overcoming this clearance.

At its outer periphery the clutch disk 44 has radially outwardly projecting holding noses or retaining cams 50 distributed around its periphery in accordance with FIGS. 1, 9 and 10 which engage in accordance with FIGS. 10 and 12 behind counter-noses or cams 57 which project radially inwardly from the clutch housing 58 into the receiving cavity 60 for the clutch disk 44 in such a way that clutch disk 44 which is pushed forwards in the direction of the belt winding reel 12 by the end face of the drive reel 22, or of an intermediate piece secured to it, is initially held radially outwardly against such an axial displacement. The clutch disk 44, which is made of resilient material, in particular of spring steel, is thereby conically resiliently deformed in accordance with FIGS. 12 and 13.

In accordance with the FIGS. 1, 9, 10 and 12 the clutch disk has engagement cut-outs 45 which are uniformly distributed around the periphery in its radially outer region but radially inwardly of the retaining noses 50. Engagement projections or cams 46 which project axially at the end guidance disk of the belt winding reel 12 which axially faces the torque generating device 18 are associated with these engagement cut-outs 45 but are however out of engagement with the engagement cut-outs 45 (FIG. 12) in the position of the clutch disk 44 in which its retaining noses 50 engage behind the counter noses 57.

As a result of the described arrangement the clutch disk 44 is normally in the disengaged position which can be seen from FIG. 12 so that the belt winding reel 12 can rotate freely unhindered by the drive reel 22 and only cooperates with the retraction spring arrangement 14' via the inner shaft 41 which extends through the bores 67, 71 and 72.

In order to engage the clutch a displacement cut-out 49 is arranged in FIGS. 1, 9 and 10 alongside the clutch disk 44 in the clutch housing 58 and extends substantially tangentially to the clutch disk 44. In the displacement cut-out 49 there is provided a slider 48 which likewise extends tangentially and which is displaceable tangentially to the clutch disk 44 in the displacement cut-out 49.

The slider 48 has an actuating rod 48" at the top and an enlarged piston region 48' with a valve wall 59 which can be broken off at the bottom. Beneath the lower end face of the piston region 48' there is located the pyrotechnical charge 16. A pressure channel 61 branches off from the displacement cut-out 49 in the direction of the torque generating device 18 (FIG. 12) and stands in flow connection with the pressure chamber 17.

With the slider 48 (FIGS. 9, 10 located in the starting position) the piston region 48' blocks the connection between the pyrotechnical charge 16 and the pressure channel 61.

In the upper region radially opposite to the clutch disk 44 the actuating rod 48" of the slider 48 has an abutment 62 which projects in the direction towards the clutch disk 44 and engages with a counter-abutment 63 provided there in accordance with FIGS. 9 and 10 in such a way that with a displacement of the slider 48 towards the top the clutch disk 44 is rotated in the clockwise sense.

The pyrotechnical charge 16 which is generally of cylindrical shape can, in accordance with FIGS. 1 to 4 and 9, be arranged at the side of the clutch 20 confronting the belt winding reel 12 parallel to and beneath the belt winding reel 12 or however, in accordance with FIG. 10, in an axial extension of the displacement cut-out 49 beneath the clutch 20. It is only important that on triggering the pyrotechnical charge 16 it is first only the slider 48 and then, after the engagement of the clutch 20, also the torque generating device 18 which is energised with pressure.

The manner of operation of the described belt tensioner is as follows:

When the acceleration sensor 43 (FIG. 3) detects an accident dependent acceleration at the vehicle it triggers the pyrotechnical charge 16 via the control line 42. Thereafter the pyrotechnical charge does not initially pressurise the torque generating device 18 as is shown by reason of simplified illustration in FIGS. 3 and 4 but rather, in accordance with FIGS. 9 and 10, initially only the piston region 48' of the slider 48, so that the latter is displaced out of the position of FIGS. 9, 10 into the position of FIGS. 11 to 13 and in so doing moves the clutch disk 44 with it so that it executes a rotary movement.

In this way the holding noses or cams 50 of the clutch disk 44 are displaced in the peripheral direction along the stationary counter-noses or cams 57 until they come out of engagement with one another in the position of FIGS. 14 to 16. The path of displacement of the slider 48 and the rotary movement of the clutch disk 44 are so calculated that in the first stage of the movement the holding noses 50 and the counter-noses 57 come out of engagement whereupon the clutch disk 44 snaps in the direction of, i.e. towards the guidance disk 47. During this the engagement projections 46 can engage into the engagement cut-outs 45 if these two elements should be coincidentally axially aligned. Should this not be the case then the webs 69 of the clutch disk 44 contact the engagement noses 46. The clutch disk 44 is now turned further in a second stage of the movement of the slider 48 until the engagement cut-outs 45 finally snap into place over the engagement noses 46.

The peripheral slots 56 in the region of the central bore 72 must permit a rotation of the clutch disk 44 relative to the drive reel 22 or to the noses 55 which permits the two stages of movement.

As a result of the described design of the clutch 20 with numerous engagement cut-outs 45 distributed around the periphery and engagement noses 46 account is taken of the need to the transmit considerable torques via the clutch 20.

In detail the engagement of the clutch 20 proceeds as follows:

As can be seen from FIG. 1 the slider 48 which is advanced tangentially on ignition of the charge 16 rotates the clutch disk 44 for the purpose of engagement with the end guidance disk 47 precisely in the opposite direction to that in which the clutch disk 44 is subsequently turned by the torque generation device 18. These opposed directions of rotation are important, so that on rotation of the clutch disk 44 the drive shaft 19 of the drive reel 22 is not turned at the same time by friction or by form-locked engagement. In the basic position prior to triggering of the pyrotechnical charge 16 the clutch disk 44 must stand relative to the drive reel 22 in such a way that the entire free turning range of the clutch disk 44 relative to the drive reel 22 provided by the peripheral slots 56 is available.

A particularly important viewpoint of the invention lies in the way in which care is taken that the engagement cut-outs 45 and the engagement noses 46 enter reliably into engagement during an engagement procedure of the clutch 20.

For this purpose the design is such that the abutment 62 on the slider 48 and the counter-abutment 63 at the clutch disk 44 remain in engagement until the clutch disk 44 has snapped over the engagement noses 46. In other words the abutments 62, 63 remain in engagement even when the holding noses 50 have released from the counter-noses 57 on the coupling housing 58 on rotation of the clutch disk 44 by the slider 48. In this case the resilient clutch disk 44 admittedly snaps out of the conical position which can be seen from FIG. 12 somewhat in the direction of the belt winding reel 12 but only so far that—when the engagement noses 46 and the engagement cut-outs 45 are not yet axially aligned—the webs 69 between the engagement cut-outs 45 come into contact on the engagement cams 46. The abutment 62 on the slider 42 is now made sufficiently wide in the direction of the spring movement of the clutch disk 44 that it still remains in engagement with the counter-abutment 63 even when the bayonet connection 50, 57 is released and the webs 69 have come into contact with the engagement noses 46. In this manner the clutch disk 44 is now turned on further by the continued advance of the slider 48 until the engagement cut-outs 45 snap over the engagement noses 46.

The clutch disk 44 now adopts the planar shape evident from FIG. 15 which is shown in broken lines in FIG. 13a. In this position the counter-abutment 63 is now axially separated from the abutment 62 of the actuating rod 48' so that the slider 48 and the clutch disk 44 are now out of engagement and the slider 48 can now be advanced without the performance of work only so far to reach the end of the displacement path, until the valve wall 59 is located in front of the pressure channel 61 and is then broken away by the pressure of the pressure source 16 in order to free the flow path from the pressure source 16 to the pressure chamber 17.

The invention thus not only leads to a mutual approach of the two clutch parts 44, 47, but also ensures a troublefree claw or sprague engagement. In FIG. 13a the direction of movement of the radially outer regions of the clutch disk 44 when the engagement cut-outs 45 snap over the engagement cams 46 is indicated by an arrow.

As a result of the design of the invention it is ensured that the clutch 20 is reliably engaged before the torque generating device 18 is subjected to pressure from the pressure source 16.

The special advantage of the use of a resilient clutch disk, which is formed in the manner of a plate spring, lies in the fact that it requires hardly any axial construction space and nevertheless enables a reliable engagement and disengagement of the clutch 20.

As a result of its inherent spring characteristics the clutch disk 44 which was initially conically deformed in accordance with FIG. 12 thus snaps finally into the planar position which can be seen from FIGS. 15 and 16 in which the engagement noses 46 engage axially in the engagement cut-outs 45 and thus produce a rotationally fixed connection between the drive reel 22 and the belt winding reel 12, which may, if necessary, have some circumferential clearance.

In this further advanced position of the slider 48 the frangible valve wall 59 has been pushed immediately before the entry to the pressure channel 61 (FIGS. 11, 12).

It is now important that the lower margin 64 of the valve wall 59 is located in the upper end position of the slider 48 somewhat above the lower boundary 65 of the pressure channel 61, whereby, as a result of the explosion pressure which is generated in the displacement cut-out 49 in the direction of the pressure channel 61, a pressure is exerted on the frangible valve wall 59 such that this breaks into the pressure channel 61 as is illustrated in FIGS. 14 and 15.

The explosion pressure generated by the pyrotechnical charge 61 can now propagate via the pressure channel 61 into the pressure chamber 17 and from the latter out through the branch lines 27, 28 into the partial chambers 23'.

The pressure build up is illustrated in FIGS. 3 and 4 by dotted marking of the relevant spaces.

As a result of the pressure build-up in the branch lines 27, 28 a corresponding pressure force is generated on the concave side of the draw bands 21 which brings about a torque at the drive reel 22 in the counter-clockwise sense in FIG. 3.

In this way the drive reel 22 rotates while the unrolled tension band 21 increasingly tightly contacts the peripheral wall 30 of the two band running chambers 23.

As the free "through-hanging" or loop region of the draw band 21 is initially comparatively short as a result of the special design of the band drawing running 23 of FIG. 4 the pressure force which is transmitted to the band is initially likewise relatively small.

If the band running chamber 23 then becomes larger, as shown in FIG. 4, then the effective "through-hanging" or loop surface of the draw band 21 enlarges whereby the pressure force which is exerted on it rises correspondingly and thus also the torque which is exerted on the drive reel 22.

In the further course of the movement the arcuate part of the draw band 21 then enters into the end region of the band running chamber 23 which becomes smaller again whereby, at the end of the belt tensioning a lower drive force is ultimately exerted on the drive reel 22.

At the conclusion of the movement the curved part of the draw band 21 lies against a concavely curved end region 66 of the band running chamber 23. The movement clearance of the draw bands 21 is now exhausted and the belt 13 is drawn in by the maximum amount of for example 205 mm.

In the position of the draw bands 21 of FIG. 4 the drawn-in length of the safety belt 13 amounts, up to this point, to about 140 mm.

If now the pressure force in the partial chambers 23' drops off due to the pyrotechnical charge being used up then the one to two windings of the spring steel draw band present on the drive reel 22 become loose, whereupon the spring tongue 35 which is pressed in accordance with FIG. 7 into a peripheral recess 36 by the tension exerted on the draw band 21 presses the loose layers of the draw band 21 outwardly as a result of its inherent spring force and adopts the relieved position evident from FIG. 8 in which the engagement between the end of the draw band 21 which is equipped with the spring tongue 35 and the drive reel 22 which results in the co-movement is cancelled.

The drive wheel 22 can now rotate unhindered under the influence of draw out and draw in movements of the safety belt 13 while the clutch 20 remains closed. In this way the normal function of the belt unwinding and winding up mechanism by means of the retraction spring arrangement 14' is ensured now as before.

If the belt 13 is for example ideally tensioned in the position of FIG. 4 or with the draw bands 21 unrolled still further, and if the pressure of the pyrotechnical charge 16 lets up, then the non-illustrated blocking device between the holder 11 and the belt winding reel 12 blocks a draw out movement now as previously which is important because the vehicle occupant falls into the belt 13 after the abrupt tensioning of the same and a drawing out of the belt must be reliably prevented.

The invention thus provides an extremely compact belt tensioner in which first the engagement of the clutch and then the tensioning of the belt is ensured by one and the same pyrotechnical charge.

The embodiment of FIGS. 5 and 6 is distinguished from that of FIGS. 1 to 4 in that the two draw bands 21 which are only shown in broken lines are united into a single continuous band and guided through a band channel 33 outside of the mounting points 26 at the housing.

For this reason the forces which occur at the draw bands 21 in the region of the mounting points 26 on pressure loading of the torque generating device 18 are only transmitted to the housing 24 to the extent that the channels which accommodate the band 21 are curved. The actual reaction forces cancel within the band region 21' located in the pressure channel 23.

In accordance with FIG. 5 the draw band 21 passes at the top left in the region of the mounting point 26 transversely through a cylindrical pressure space 17, whereby the region 21" of the draw band 21 which passes through this pressure space 17 subdivides the space into two partial spaces 17', 17".

The region 21' of the draw band 21 which extends in the pressure channel 33 serves solely to mutually support the parts of the draw bands 21 located in the band running chambers 23.

In accordance with FIG. 5 a groove 34 can also be provided at the convex side of the sealing walls 29 which ensures that at the start of operation, when the draw bands 21 still lie tightly on the convex side of the sealing walls 29, the pressure coming from the pressure chamber 17 immediately propagates over the full radial extent of the draw bands 21.

In FIG. 5 it is also shown that a radially inwardly disposed region of the sealing walls 29 can be pivotally connected to the other part in the direction of the arrow about a hinge 74.

In this way, following triggering, the inner sealing wall region which can be pivoted away is pivoted away whereby the automatic disengagement of the band ends from the peripheral recesses in the drive reel 22 described with reference to FIGS. 7 and 8 is also not hindered in the region of the sealing walls 29.

In order that the radially inner part of the sealing walls 29 of FIG. 5 pivots away in the direction of the arrows with a pressure reduction, following tensioning, a non-illustrated spreading spring must be provided between the two mutually pivotable parts of the sealing wall 29.

A spreading spring of this kind can be avoided in the embodiment of FIG. 5a if the sealing walls 29 are held by the tension of the draw band 21 lying on them via a suitably shaped partition location 75 and via an abutment 24' fixed relative to the housing. As a result of this design the sealing walls 29 are pressed in the normal state against the partition joint 75 and against the abutment 24' by a suitable prestressing of the drive reel 22 by the draw band 21 standing under tension.

On triggering of the pyrotechnical charge the pressure present in the partial space 23' then presses the sealing walls 29 against the partition joint 75 and the abutment 24'. Only when the draw bands 21 have largely unwound from the drive wheel 22, and the pressure in the partial chambers 23' has dropped off again, do the now relaxing layers of the draw bands 21 on the drive wheel 22 press against the sealing walls 29 so that they slide along the partition joint 75 and the abutment 24' in the direction of the arrow 73 and thus not prevent the relaxation of the layers of the draw bands 21 on the drive wheel 22. In this manner the ends of the draw bands 21 which are rotationally fixedly hung in to the periphery of the drive reel 22 automatically resiliently release from the recesses into which they are hung when the hanging in points are located directly opposite to the sealing lip 31 of a sealing wall 29.

The inventive concept of this embodiment is thus to be seen in the fact that the sealing walls 29 are so releasably mounted on the housing 24 that they are kept in their desired position by the draw band 21 which stands under tension or by the pressure in the partial space 23' but, when no longer contacted by the draw band 21 and with falling pressure automatically release from the housing 24, 24' through the relaxing coils of the draw bands 21 on the drive reel 22.

The mounting bores 70 illustrated in FIG. 5 serve for the axial clamping of the individual housings of the additional drive 15, clutch 20 and retraction spring arrangement 14' and also of the frame 11 of the belt winding reel 12.

Through the design of the invention the tensioning of the safety belt by 140 to 205 mm can be achieved within approximately 10 msec after the triggering of the pyrotechnical charge.

The draw bands 21 are wound three to four times around the drive shaft 19 or of the drive reel 22 in the starting position. The diameter of the drive shaft 19 or the drive reel 22 and the number of the turns of the draw bands thereon depend on the desired draw-in length during tensioning. Moreover, attention must be paid to the fact that after the band loops have run fully through the band running space 23 one to two turns are present on the drive shaft 19 or the drive reel 22 so that the automatic movement of the band ends out of the peripheral recess 36 (FIG. 7) does not occur prematurely. The at least one to two turns on the drive shaft 19 or the drive reel 22 are thus necessary in order to ensure that the spring tongue 35 or other hanging-in or fixing member is reliably pressed into a corresponding recess 36 of the drive shaft 19 of the drive wheel 22 so long as tension is present on the draw bands 21.

Whereas, instead of two diametrically oppositely disposed draw bands 21 which operate on one and the same drive shaft 19 or drive reel 22, several such arrangements which are distributed around the periphery could fundamentally be used, the use of more than four draw bands 21 distributed around the periphery with corresponding sealing walls 29 cannot be considered for constructional reasons. Ideal is in any event the use of two diametrically oppositely disposed draw bands 21 with corresponding sealing walls 29, because in this way the bearing forces on the drive shaft 9 or on the drive reel 22 are already hereby largely overcome.

In the embodiment of FIG. 17 the flexible draw band 21 extends with the same sense of curvature which it has at the drive reel 22 through the band running chamber 23 to the peripheral wall 30 which lies radially opposite to the drive reel 22 and preferably concentric to the drive shaft 19 where it is secured to the housing 24 in the region of the opening of an explosion pressure feedline 27 in the band running chamber 23 at 26.

Between the housing 24 and the periphery of the drive reel 22, or of the draw band 21 wound thereon, a sealing wall 29 extends substantially parallel to the feed line 27 and close to the latter to the periphery of the drive reel 22 where a sealing lip 29' is provided which sealingly contacts the coiled up draw band 21. In this manner the partial chambers 23', 23" are decoupled from one another pressurewise. At the peripheral end of the band running chamber 23 in the propagation direction of the flexible draw band 21 there is located apart from the sealing wall 29 also the vent bore 37 which leads a vent channel 37' into the surrounding atmosphere.

As shown in chain-dotted lines and in fine hatching in FIG. 17 the sealing wall 29 preferably has a projection 29''' towards the partial chamber 23' so that the sealing lip 29' is somewhat lengthened in the direction of the pressure chamber 23'. The projection 29''' is of flexible design and could also be hingedly secured to the actual sealing wall 29, and indeed about a pivot axis parallel to the axis of the drive shaft 19. In this manner the sealing lip 29' is pressed by the pressure in the partial chamber 23 particularly well in sealing manner against the outer surface of draw band 21 wound onto the drive reel 22.

FIG. 18 shows a similar embodiment to that of FIGS. 3 and 4 however the flexible draw bands 21 extend, similarly to the embodiment of FIG. 17, without reversal of the direction of curvature which they have on the drive reel 22, through the band running chambers 23 to the peripheral wall 30 in order to be secured there to the housing 24 at 26.

In this embodiment the partial chambers 23" are also vented towards the surrounding atmosphere at the peripheral end through a vent bore 37 and a subsequent vent channel 37'.

The important advantage of the embodiment of FIG. 17 and 18 lies in the fact that the pressure in the pressure charged partial chamber 23' can propagate up to the sealing lip 29' of the sealing wall of sealing walls 29 so that the region of the flexible draw band 21 which extends freely through the band running chambers 23, and is responsible for the tension force generation brought about by the pressure loading, can be considerably enlarged relative to the embodiment of FIGS. 3 and 4, and indeed, in the present embodiment, by the diameter of the drive reel 22. With the same pressure the tension force of the flexible draw band 21 which sets the drive reel 22 in motion is thus decisively increased.

In FIG. 18 the flexible draw band is shown in continuous lines at the start of pressure loading and also in broken lines in two further advanced stages of a pressure release in which the safety belt is already more strongly tensioned.

Particularly important is the longitudinal extent of the sealing walls 29 essentially tangential to the drive reel 22. Furthermore, the sealing walls 29 are flexible in accordance with the invention, i.e. are in particular of elastically resilient design or are for example hingedly secured to the housing 24 at 29''', with the arrangement being such that through small spring forces the sealing walls 29 can be so biased in the direction towards the flexible draw band 21 wound onto the drive reel 22 that the sealing lips 29' are lightly pressed against the outer surface of the wound up draw band 21.

In this manner each pressure loading of the surface of the sealing walls 29 confronting the partial chambers 23 causes the sealing lip 29' of the sealing walls to be pressed against the outer surface of the draw band 21 wound onto the drive wheel 22, whereby a sealing action which increases with the pressure in the partial chamber 23' is achieved between the sealing lips 29' and the drive reel 22 or the draw band 21 wound onto it.

Furthermore, in advantageous manner, the draw band 21 is also pressed radially from the inside towards the outside against the sealing lip 29' by the pressure which acts on it in the associated partial space 23'.

A further embodiment is shown in FIG. 19 which only reproduces the important part of the belt tensioner. The belt tensioner has a draw band 21 which extends over the width of the band running chamber 23 as the force transmitting sealing means in a housing 24. The draw band 21 is secured at its one end to a mounting point 25 at the drive reel 22. The draw band is wound partially onto the drive reel in a direction such that when drawing off the draw band 21 the drive reel 22 rotates in the belt winding up direction and is guided from the radially outer end of the wound up part from the drive reel 22 into a 180° arc. This arc which points away from the pressure feedline 27 towards the smoothly formed peripheral wall 30 of the housing 24 which it contacts and is then led to a mounting point 26 at the start of the band running chamber 23 adjacent to the feedline 27 where its other end is secured.

The housing 24 is formed similarly to that of FIG. 1 with a planar end wall 51 and a planar cover 53 which are contacted inwardly by the edges of the draw band 21 so that in the direction of rotation the pressure loaded partial chamber 23' is formed before the 180° arc and the partial chamber 23" vented at 37 is formed behind the 180° arc.

The clutch 20 which is only indicated in broken lines and which is normally disengaged and engage in non-illustrated manner with accident dependent accelerations must be imagined to be present between the draw band 21 and the drive shaft 19 which must be imagined as being rotationally fixedly connected to the belt reel and which projects axially from the drive wheel 22. The clutch is however preferably provided between the drive shaft 19 and the belt reel 15.

The embodiment shown in FIG. 20 has an additional sealing cylinder 76 in the 180° arc of the draw band 21 with the flat end faces of the sealing cylinder 76 standing in sliding sealing engagement with the wall 51 and the cover 53. In this way a better end face sealing of the two parts of the band running chamber 23 is achieved.

In both cases the clutch 20 should be designed so that the engagement is cancelled again after an adequate time following the accident dependent tensioning. A preferred example for a clutch was described above with reference to FIGS. 1 and 13 to 16.

The manner of operation of the embodiments shown in FIGS. 19 and 20 is as follows:

In the starting position the draw band 21 is wound up by a maximum amount onto the drive wheel 22 and the 180° arc is located close to and opposite to the feedline 27. In this manner the pressure chamber 23' which is present between the draw band 21, the pressure sealed sealing wall 29, the peripheral wall 30 and also the end walls 51, 53, and which can be charged from the feedline 27, has its minimum volume.

In the starting position it is however also possible that the draw band 21 does not have a 180° arc but rather passes in an essentially straight line from the drive reel 22 to the peripheral wall 30 to the mounting point 26 or close to it.

If then an acceleration caused by an accident occurs the pressure source is triggered and the clutch 20 engages between the draw band 21 and the non-illustrated belt winding mechanism.

The driving gases from the pyrotechnical charge flow through the draw band 21 into the pressure space 23' so that the pressure here is larger than in the part of the running chamber remote from the pressure source. This pressure difference brings about a force which is directed in the peripheral direction away from the draw band 21 towards the 180° arc of the draw band 21 whereby, since the draw band is held at the housing at the mounting point 26, a counter-clockwise torque is exerted onto the drive shaft 22 and the drive shaft 22 is caused to execute a corresponding rotary co-movement. With this direction of rotation of the drive shaft 22 the non-shown belt reel is turned via the clutch 20 into the belt tensioning direction and the draw band 21 which is wound onto the drive reel and held fast at its other end at the mounting point 26 is simultaneously unwound. Under the pressure difference the draw band 21 in the partly circular band running chamber 23 follows a path which becomes larger during this procedure starting from the mounting point 26. The 180° arc thereby runs through the band running chamber 23 in the counter-clockwise sense.

The FIGS. 19 and 20 show the belt tensioner shortly after the start of the pressure loading where the 180° arc has first moved through a smaller part of the band running chamber 23. In the event that the draw band 21 is guided in the starting position in a straight line from the drive shaft 22 to the peripheral wall 30 close to the mounting point 26, the 180° arc will first form at the start of the pressure loading with an unwinding rotation of the hub 22 and will then move through the band running chamber 23 as described above.

The sealing cylinder 76 of FIG. 20 executes a rolling off movement on the band part which follows the peripheral wall 30 during the movement of the 180° arc through the band running chamber 23. In this case the pressure force is largely transmitted via the sealing cylinder 76 to the 180° arc.

The distance by which the draw band 21 is unwound corresponds essentially to the product of the running angle of the apex of the 180° arc (in radians) and the peripheral wall diameter. The angle of rotation through which the drive shaft 22 is turned results from the quotient of this parameter and the drive roll diameter. Accordingly the angle of rotation of the drive roll is enlarged by the ratio of the peripheral diameter to the drive roll diameter.

We claim:

1. Belt tensioner for safety belt arrangements in motor vehicles having a holder (11) for securing to the vehicle chassis and on the holder a belt winding reel (12) with a safety belt (13) wound thereon, a retraction spring arrangement (14, 14') by means of which the safety belt (13) is continuously and lightly so pretensioned in the retraction direction that it only lies loosely on the vehicle occupant secured by it, a blocking arrangement between the belt winding reel (12) and the holder (11) of the vehicle chassis which blocks the safety belt (13) against being pulled out if suddenly pulled, and/or in the event of an acceleration resulting from an accident, and an additional drive (15) connected to the belt winding reel (12) via a clutch (20), wherein the additional drive (15) is normally separated drivewise from the belt winding reel (12) by the disengaged clutch (20), but is abruptly activated in the event of an acceleration resulting from an accident and is rotationally fixedly coupled with the belt winding reel (12) via the then engaged clutch (20) in order, before the vehicle occupant accelerates against the safety belt (13), to wind up such a length of the safety belt that the safety belt lies tightly on the vehicle occupant, with the additional drive (15) having a pressure source (16) which is triggered or ignited by the accident dependent response of an acceleration sensor and which, on being triggered, abruptly builds up a high pressure chamber (17), a torque generating device (18) which is energised by the pressure in the pressure chamber (17) and a drive shaft (19) connected to the torque generating device (18) which is rotationally fixedly connected with the belt winding reel (12) via the clutch (20), characterised in that the torque generating device (18) has at least one flexible tension band (21) which is secured at one end at a first mounting point (25) to the periphery of the drive shaft (19), or to the drive reel (22) which is concentrically mounted thereon, and is partially wound onto the drive shaft (19), or onto the drive reel (22), and is secured at the other end at a second mounting point (26) to the peripheral wall (30) of a band running chamber (23) which is arranged within a housing (24) around the drive shaft (10), or around the drive reel (22) and has a width corresponding to the width of the draw band (21) in such a way that the draw band (21) extends through the band running chamber (23) while subdividing the band running chamber (23) into two partial chambers (23', 23") sealed off relative to one another; and in that the partial chamber (23') which on being subjected to pressure brings about an unwinding of the tension band (21) from the rotating drive shaft (19) or drive reel (22) is connected to the pressure space (17) and with the other partial space (23") is vented; and in that, for the pressurewise decoupling of the partial chambers (23' and 23"), at least one sealing wall (29) is provided which extends between the housing (24) and the periphery of the flexible draw band (21) which is wound onto the drive shaft (19), or onto the drive reel (22) concentrically mounted thereon.

2. Belt tensioner in accordance with claim 1, characterised in that the flexible draw band (21) reverses its direction of curvature after lifting away from the drive shaft (19) or the drive reel (22) and contacts the peripheral wall (30) of the housing with this reversed direction of curvature.

3. Belt tensioner in accordance with claim 1 with only one flexible draw band (21), characterised in that the two partial chambers (23', 23") are decoupled pressure-wise by the sealing wall (29) which extends at the end of the range of movement of the flexible draw band (21) from the housing (24) to the periphery of the draw band (21) wound onto the drive shaft (19), or onto the drive reel (22), and has a sealing lip (29') which stands in sealing engagement with the coiled up draw band (21).

4. Belt tensioner in accordance with claim 1, characterised in that vent openings (37) are provided at the sealing walls (29) at the side facing the non-pressure loaded partial space (23").

5. Belt tensioner in accordance with claim 1, characterised in that all the rotating parts (12, 19, 22, 41, 44, 47) are coaxially arranged at one end face of the belt winding reel (12).

6. Belt tensioner in accordance with claim 1, characterised in that the retraction spring arrangement (14') is arranged at the same end face of the belt winding reel (12) as the additional drive (15) and the clutch (20), with the additional drive (15) and the clutch (20) lying between the retraction spring arrangement (14') and the belt winding (21).

* * * * *